(12) United States Patent
Manolakos et al.

(10) Patent No.: US 11,751,082 B2
(45) Date of Patent: Sep. 5, 2023

(54) REPORTING OF INFORMATION RELATED TO SOUNDING REFERENCE SIGNALS (SRS) TIMING ADJUSTMENTS

(71) Applicant: QUALCOMM Incorporated, San Diego, CA (US)

(72) Inventors: Alexandros Manolakos, San Diego, CA (US); Sony Akkarakaran, Poway, CA (US); Guttorm Ringstad Opshaug, Redwood City, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 16/872,599

(22) Filed: May 12, 2020

(65) Prior Publication Data

US 2020/0374728 A1 Nov. 26, 2020

(30) Foreign Application Priority Data

May 21, 2019 (GR) .............................. 20190100223

(51) Int. Cl.
*H04W 24/10* (2009.01)
*H04W 72/21* (2023.01)

(52) U.S. Cl.
CPC ........... *H04W 24/10* (2013.01); *H04W 72/21* (2023.01)

(58) Field of Classification Search
None
See application file for complete search history.

(56) References Cited

U.S. PATENT DOCUMENTS 8,526,420 B2 9/2013 Weng et al.
2010/0098051 A1\* 4/2010 Uemura ............ H04W 56/0015
370/350

(Continued)

FOREIGN PATENT DOCUMENTS

CA 2746589 A1 \* 1/2012 ............ H04J 3/0682
WO WO-2017028599 A1 \* 2/2017

(Continued)

OTHER PUBLICATIONS

Catt: "Summary#3 of UE and gNB Measurements for NR Positioning", 3GPP Draft, R1-1905808, summary or NR POS Measurements,R1-1905760, 3GPP TSG RAN WG1 Meeting #96bis, 3rd Generation Partnership Project(3GPP), Mobile Competence Centre, 650, Route Des Lucioles, F-06921 Sophia-Antipolis Cedex; Franc, vol. RAN WG1, no. Xi'an, China, Apr. 8, 2019-Apr. 12, 2019, Apr. 15, 2019 (Apr. 15, 2019), XP051707855, pp. 1-27, Retrieved from the Internet URL: http://www.3gpp.org/ftp/tsg%5Fran/WG1%5FRL1/TSGR1%5F96b/Docs/R1%2D1905808%2Ezip [retrieved on Apr. 15, 2019].

(Continued)

*Primary Examiner* — Ajit Patel
*Assistant Examiner* — Liem H. Nguyen
(74) *Attorney, Agent, or Firm* — QUALCOMM Incorporated

(57) ABSTRACT

Disclosed are techniques for wireless communication. In an aspect, a UE transmits, at a first time during a measurement window for positioning purposes, a first uplink reference signal in accordance with a first timing adjustment parameter, wherein the first time is offset from a downlink frame time of a base station by an amount of the first timing adjustment parameter, determines whether to use a second timing adjustment parameter, transmits, in response to the determination to use the second timing adjustment param- (Continued)

eter, at a second time during the measurement window, a second uplink reference signal in accordance with a second timing adjustment parameter, wherein the second time is offset from the downlink frame time of the base station by an amount of the second timing adjustment parameter, and transmits a report indicating that the second timing adjustment parameter has been applied to at least the second uplink reference signal.

32 Claims, 15 Drawing Sheets

(56) References Cited

U.S. PATENT DOCUMENTS

| | | | | |
|---|---|---|---|---|
| 2011/0274220 | A1* | 11/2011 | Andgart | H04L 27/2672 375/342 |
| 2012/0113904 | A1* | 5/2012 | Anderson | H04W 76/28 370/329 |
| 2012/0120821 | A1* | 5/2012 | Kazmi | H04W 56/0045 370/336 |
| 2012/0129550 | A1* | 5/2012 | Hannan | G01S 5/0221 455/456.1 |
| 2012/0257575 | A1* | 10/2012 | Davydov | H04B 7/0619 370/328 |
| 2013/0250929 | A1* | 9/2013 | Dinan | H04W 56/001 370/337 |
| 2014/0086161 | A1* | 3/2014 | Cai | H04W 56/0045 370/329 |
| 2014/0185520 | A1* | 7/2014 | Gao | G01S 5/021 370/328 |
| 2014/0274160 | A1* | 9/2014 | Xiao | H04W 64/00 455/456.1 |
| 2015/0163767 | A1* | 6/2015 | Shaw | G01S 5/0263 455/456.1 |
| 2015/0189610 | A1* | 7/2015 | Siomina | H04L 5/14 370/280 |
| 2015/0351059 | A1* | 12/2015 | Seo | H04W 56/0025 370/350 |
| 2017/0111908 | A1* | 4/2017 | Xiong | H04W 74/0833 |
| 2017/0238268 | A1* | 8/2017 | Yang | H04W 72/0446 370/329 |
| 2017/0238298 | A1* | 8/2017 | Wang | H04L 5/005 455/452.1 |
| 2017/0288897 | A1* | 10/2017 | You | G01S 5/0252 |
| 2018/0139747 | A1* | 5/2018 | Hosseini | H04W 56/001 |
| 2018/0279334 | A1* | 9/2018 | Lim | H04L 27/2607 |
| 2019/0053089 | A1* | 2/2019 | Kwak | H04B 7/0647 |
| 2019/0268124 | A1* | 8/2019 | Luo | H04W 76/27 |
| 2019/0342845 | A1* | 11/2019 | Laselva | H04L 1/1812 |
| 2019/0350003 | A1* | 11/2019 | Jang | H04W 56/0045 |
| 2020/0305188 | A1* | 9/2020 | Liu | H04W 74/006 |
| 2020/0314788 | A1* | 10/2020 | Yu | H04W 56/0065 |
| 2021/0014644 | A1* | 1/2021 | Wu | G01S 5/0036 |
| 2021/0058890 | A1* | 2/2021 | Akkarakaran | G01S 5/0036 |
| 2021/0136713 | A1* | 5/2021 | Yoon | H04W 72/0453 |
| 2021/0175964 | A1* | 6/2021 | Kusashima | H04W 48/16 |
| 2021/0176022 | A1* | 6/2021 | Qi | H04L 5/02 |
| 2021/0250796 | A1* | 8/2021 | Kim | H04W 24/10 |
| 2021/0377904 | A1* | 12/2021 | Huang | H04W 64/003 |
| 2022/0060243 | A1* | 2/2022 | Keating | H04B 7/0452 |
| 2022/0060265 | A1* | 2/2022 | Xu | H04L 5/0012 |
| 2022/0182200 | A1* | 6/2022 | Qi | H04W 64/00 |

FOREIGN PATENT DOCUMENTS

| | | | | |
|---|---|---|---|---|
| WO | WO-2018127181 | A1 * | 7/2018 | H04B 17/373 |
| WO | WO-2020167890 | A1 * | 8/2020 | H04L 5/0035 |

OTHER PUBLICATIONS

Ericsson: "LPP, RRC and UE Rx-Tx Aspects ot NR RAT Dependent Positioning", 3GPP Draft, R2-1915652,3GPP TSG-RAN WG2#108, 3rd Generation Partnership Project (3GPP), Mobile Competence Centre, 650, Route Des Lucioles, F-06921 Sophia-Antipolis Cedex, France, vol. RAN WG2, no. Reno, NV, Nov. 18, 2019-Nov. 22, 2019, Nov. 7, 2019 (Nov. 7, 2019),XP051816033, pp. 1-41, Retrieved from the Internet: URL: https://ftp.3gpp.org/tsg_ran/WG2_RL2/TSGR2_108/Docs/R2-1915652.zip R2-1915652 LPP and RRC Aspects. docx [retrieved on Nov. 7, 2019] 2.4 Correcting RT Errors.
International Search Report and Written Opinion—PCT/US2020/032605—ISA/EPO—dated Sep. 2, 2020.
Qualcomm Incorporated: "UE & gNB Measurements for NR Positioning", 3GPP Draft, R1-1905034, 3GPP TSG RAN WG1 #96bis, 3rd Generation Partnership Project (3GPP), Mobile Competence Centre, 650, Route Des Lucioles, F-06921 Sophia-Antipolis Cedex, France vol. RAN WG1, no. Xi'an, China, Apr. 8, 2019-Apr. 12, 2019, Apr. 3, 2019 (Apr. 3, 2019), XP051707370, pp. 1-9, Retrieved from the Internet: URL: http://www.3gpp.org/ftp/tsg%5Fran/WG1%5FRL1/TSGR1%5F96b/Docs/R1%2D1905034%2Ezip [retrieved on Apr. 3, 2019] Lines Following Proposal 1., p. 1.
3GPP TS 38.331: "3rd Generation Partnership Project; Technical Specification Group Radio Access Network; NR; Radio Resource Control (RRC) Protocol Specification (Release 15)", 3GPP TS 38.331 V15.5.1 (Apr. 2019), pp. 1-489.
3GPP TS 38.133, "3rd Generation Partnership Project; Technical Specification Group Radio Access Network; NR; Requirements for Support of Radio Resource Management (Release 15)", 3GPP TS 38.133, V15.5.0, Mar. 2019, pp. 1-893.
Samsung: "DL and UL Reference Signals Design for NR Positioning", 3GPP Draft, 3GPP TSG RAN WG1 #96b, R1-1904394 NR Positioning DL and UL RS Design_SS, 3rd Gen Partnership Project (3GPP), Mobile Competence Centre, 650, Route Des Lucioles, F-06921, Sophia-Anti polis Cedex, FR, vol. RAN WG1, No. Xi'an, CN, Apr. 8, 2019-Apr. 12, 2019, Apr. 2, 2019 (Apr. 2, 2019), XP051707199, pp. 1-15, Retrieved from the Internet: URL: https://www.3gpp.org/ftp/tsg_ran/WG1_RL1/TSGR1_96b/Docs/R1-1904394.zip, [retrieved Apr. 2, 2019]Sections 2,3,4, Abstract, Section 2.2.2, 2.4.

* cited by examiner

REPORTING OF INFORMATION RELATED TO SOUNDING REFERENCE SIGNALS (SRS) TIMING ADJUSTMENTS

CROSS-REFERENCE TO RELATED APPLICATIONS

The present Application for Patent claims priority under 35 U.S.C. § 119 to Greek Patent Application No. 20190100223, entitled "REPORTING OF INFORMATION RELATED TO SOUNDING REFERENCE SIGNALS (SRS) TIMING ADJUSTMENTS," filed May 21, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, also referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes transmitting, at a first time during a measurement window for positioning purposes, a first uplink reference signal in accordance with a first timing adjustment parameter, wherein the first time is offset from a downlink frame time of a base station by an amount of the first timing adjustment parameter, determining whether to use a second timing adjustment parameter, transmitting, in response to the determination to use the second timing adjustment parameter, at a second time during the measurement window, a second uplink reference signal in accordance with a second timing adjustment parameter, wherein the second time is offset from the downlink frame time of the base station by an amount of the second timing adjustment parameter, and transmitting a report indicating that the second timing adjustment parameter has been applied to at least the second uplink reference signal.

In an aspect, a method of wireless communication performed by a base station includes receiving, from a UE during a measurement window for positioning purposes, a first uplink reference signal, receiving, from the UE during the measurement window, a second uplink reference signal, receiving a report indicating that a timing adjustment parameter has been adjusted for at least the second uplink reference signal, and determining one or more positioning measurements based on the first uplink reference signal, the second uplink reference signal, and information in the report related to the second uplink reference signal.

In an aspect, a UE includes a memory, at least one transceiver, and at least one processor communicatively coupled to the memory and the at least one transceiver, the at least one processor configured to: cause the at least one transceiver to transmit, at a first time during a measurement window for positioning purposes, a first uplink reference signal in accordance with a first timing adjustment parameter, wherein the first time is offset from a downlink frame time of a base station by an amount of the first timing adjustment parameter, determine whether to use a second timing adjustment parameter, in response to the determination to use the second timing adjustment parameter, cause the at least one transceiver to transmit, at a second time during the measurement window, a second uplink reference signal in accordance with the second timing adjustment parameter, wherein the second time is offset from the downlink frame time of the base station by an amount of the second timing adjustment parameter, and cause the at least one transceiver to transmit a report indicating that the second timing adjustment parameter has been applied to at least the second uplink reference signal.

In an aspect, a base station includes a memory, at least one transceiver, and at least one processor communicatively coupled to the memory and the at least one transceiver, the at least one processor configured to: receive, from a UE during a measurement window for positioning purposes, a first uplink reference signal, receive, from the UE during the measurement window, a second uplink reference signal, receive, via the at least one transceiver, a report indicating that a timing adjustment parameter has been adjusted for at least the second uplink reference signal, and determine one or more positioning measurements based on the first uplink reference signal, the second uplink reference signal, and information in the report related to the second uplink reference signal.

In an aspect, a UE includes means for transmitting, at a first time during a measurement window for positioning purposes, a first uplink reference signal in accordance with a first timing adjustment parameter, wherein the first time is offset from a downlink frame time of a base station by an amount of the first timing adjustment parameter, means for determining whether to use a second timing adjustment parameter, means for transmitting, in response to the determination to use the second timing adjustment parameter, at a second time during the measurement window, a second uplink reference signal in accordance with the second timing adjustment parameter, wherein the second time is offset from the downlink frame time of the base station by an amount of the second timing adjustment parameter, and means for transmitting a report indicating that the second timing adjustment parameter has been applied to at least the second uplink reference signal.

In an aspect, a base station includes means for receiving, from a UE during a measurement window for positioning purposes, a first uplink reference signal, means for receiving, from the UE during the measurement window, a second uplink reference signal, means for receiving a report indicating that a timing adjustment parameter has been adjusted for at least the second uplink reference signal, and means for determining one or more positioning measurements based on the first uplink reference signal, the second uplink reference signal, and information in the report related to the second uplink reference signal.

In an aspect, a non-transitory computer-readable medium storing computer-executable instructions includes computer-executable instructions comprising at least one instruction instructing a UE to transmit, at a first time during a measurement window for positioning purposes, a first uplink reference signal in accordance with a first timing adjustment parameter, wherein the first time is offset from a downlink frame time of a base station by an amount of the first timing adjustment parameter, at least one instruction instructing the UE to determine whether to use a second timing adjustment parameter, at least one instruction instructing the UE to transmit, in response to the determination to use the second timing adjustment parameter, at a second time during the measurement window, a second uplink reference signal in accordance with the second timing adjustment parameter, wherein the second time is offset from the downlink frame time of the base station by an amount of the second timing adjustment parameter, and at least one instruction instructing the UE to transmit a report indicating that the second timing adjustment parameter has been applied to at least the second uplink reference signal.

In an aspect, a non-transitory computer-readable medium storing computer-executable instructions includes computer-executable instructions comprising at least one instruction instructing a base station to receive, from a UE during a measurement window for positioning purposes, a first uplink reference signal, at least one instruction instructing the base station to receive, from the UE during the measurement window, a second uplink reference signal, at least one instruction instructing the base station to receive a report indicating that a timing adjustment parameter has been adjusted for at least the second uplink reference signal, and at least one instruction instructing the base station to determine one or more positioning measurements based on the first uplink reference signal, the second uplink reference signal, and information in the report related to the second uplink reference signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
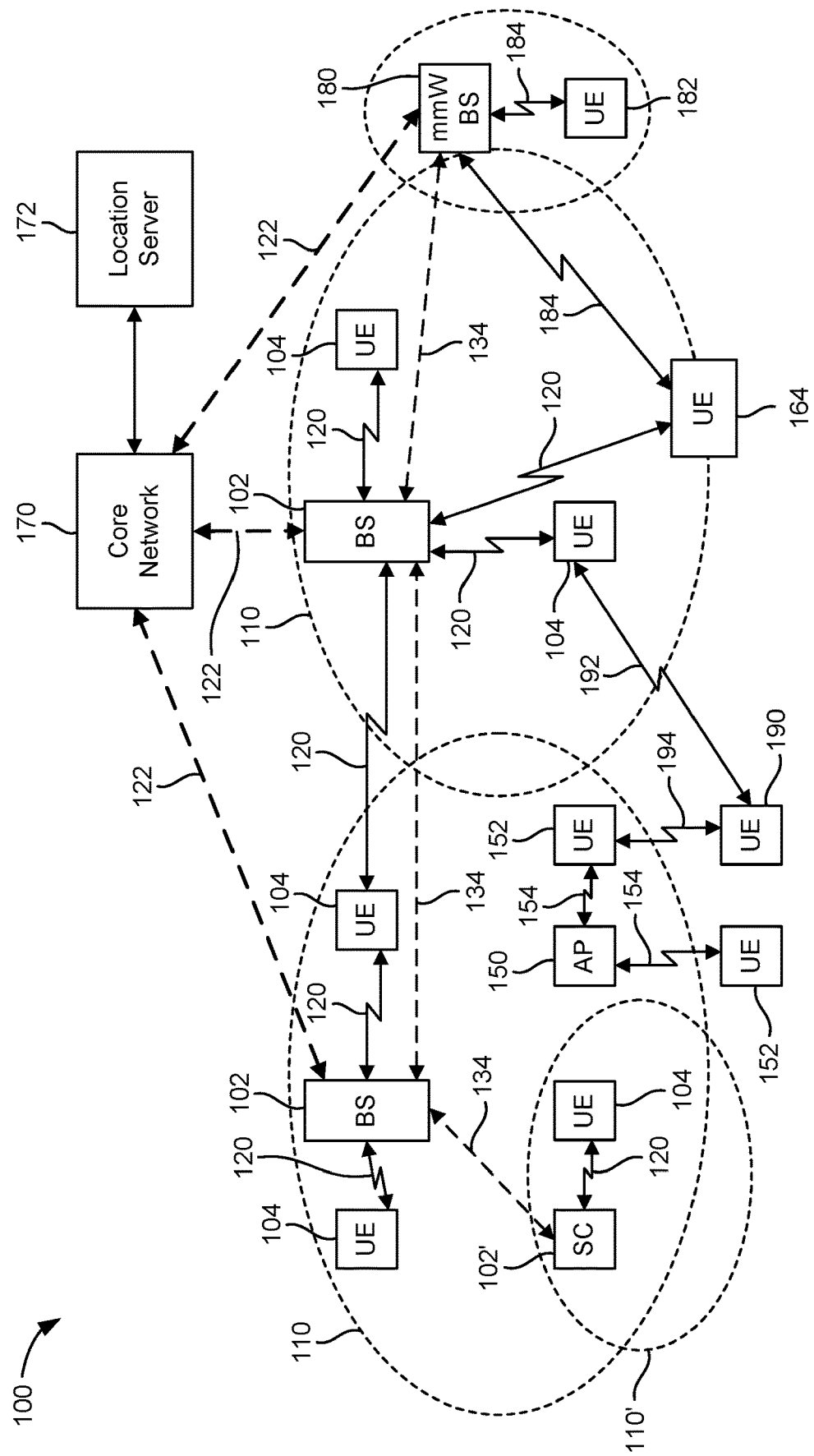
FIG. 1 illustrates an exemplary wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) NodeB (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL TypeD, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
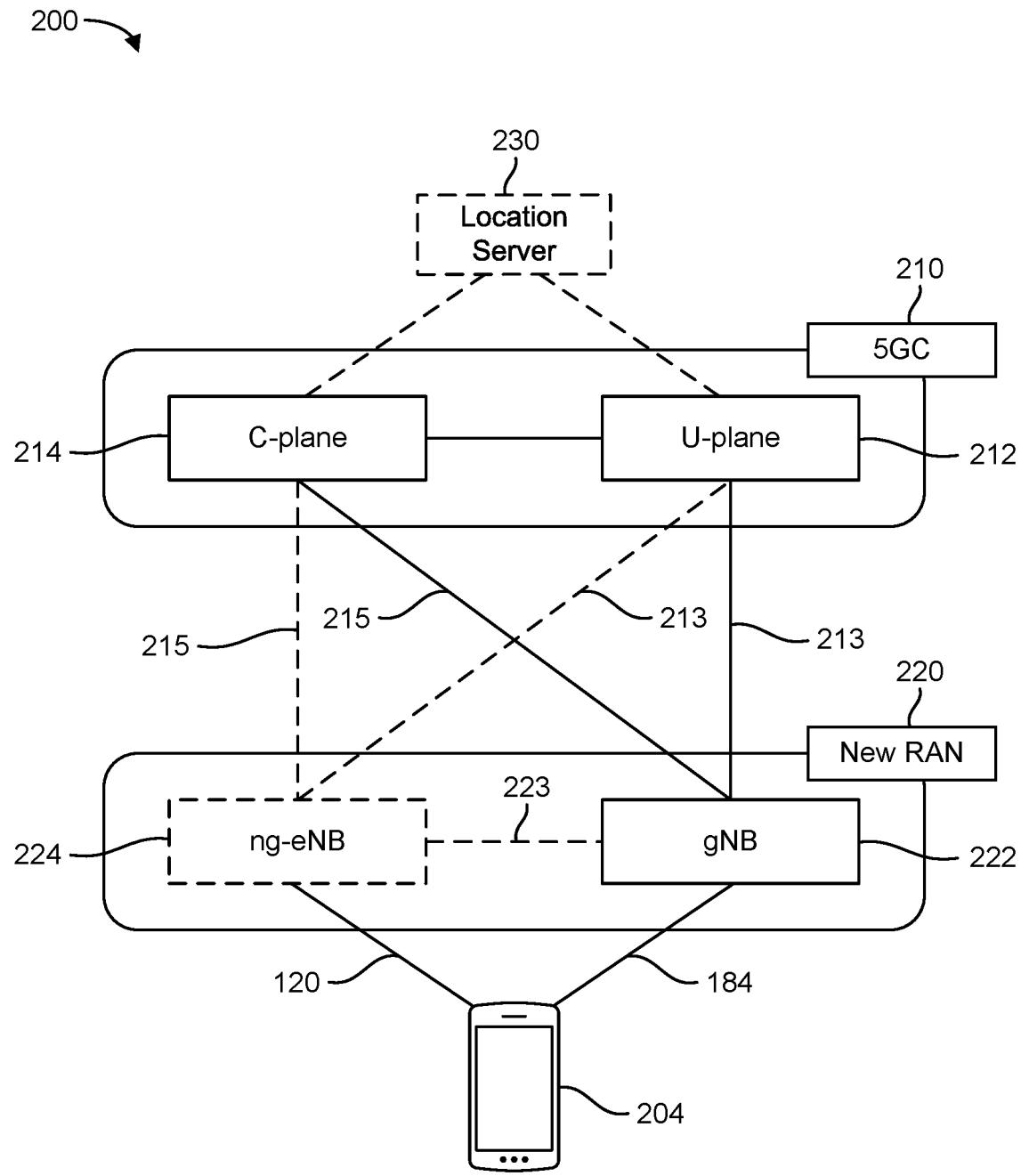
FIGS. 2A and 2B illustrate example wireless network structures, according to aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.)

which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
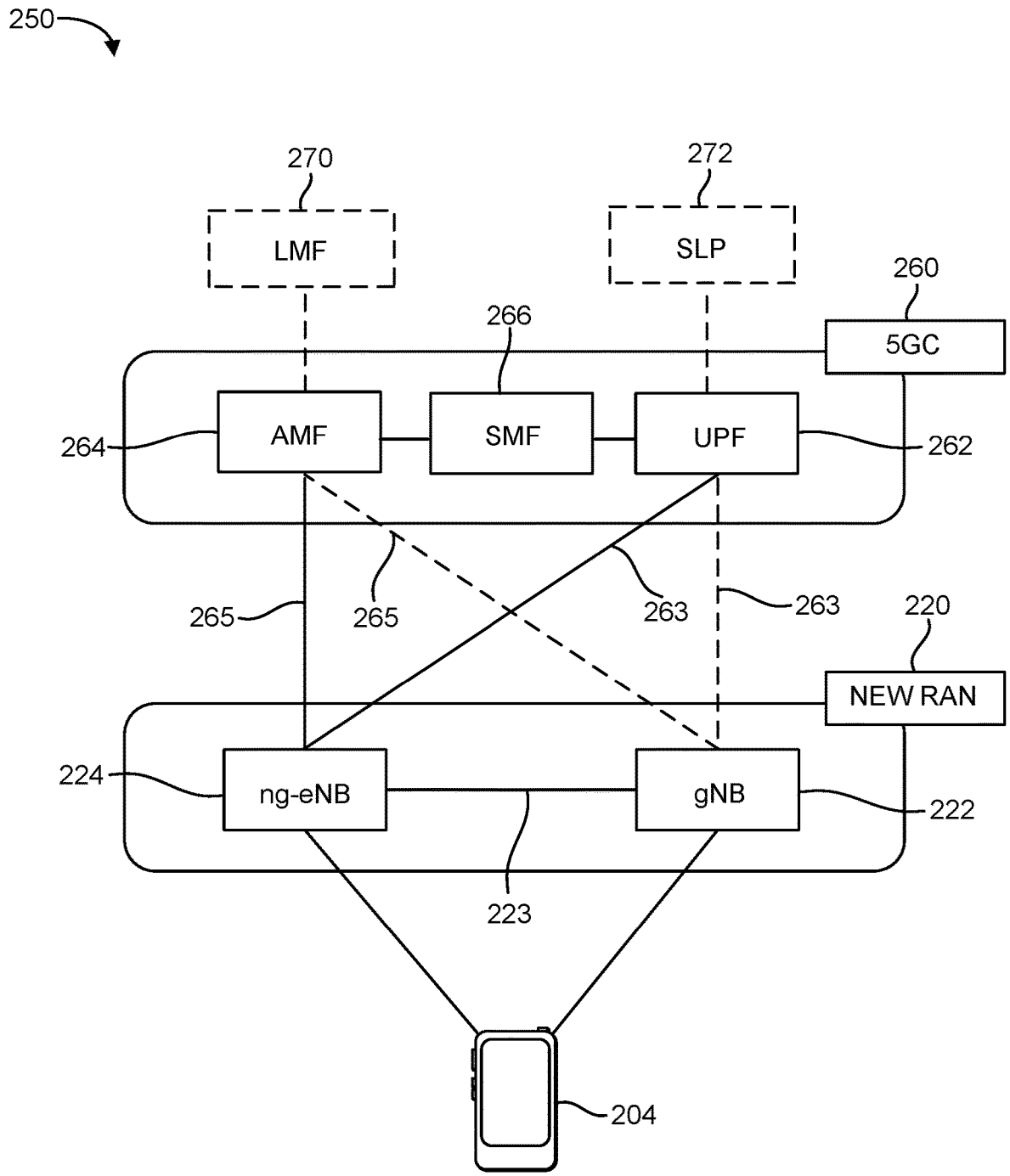

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
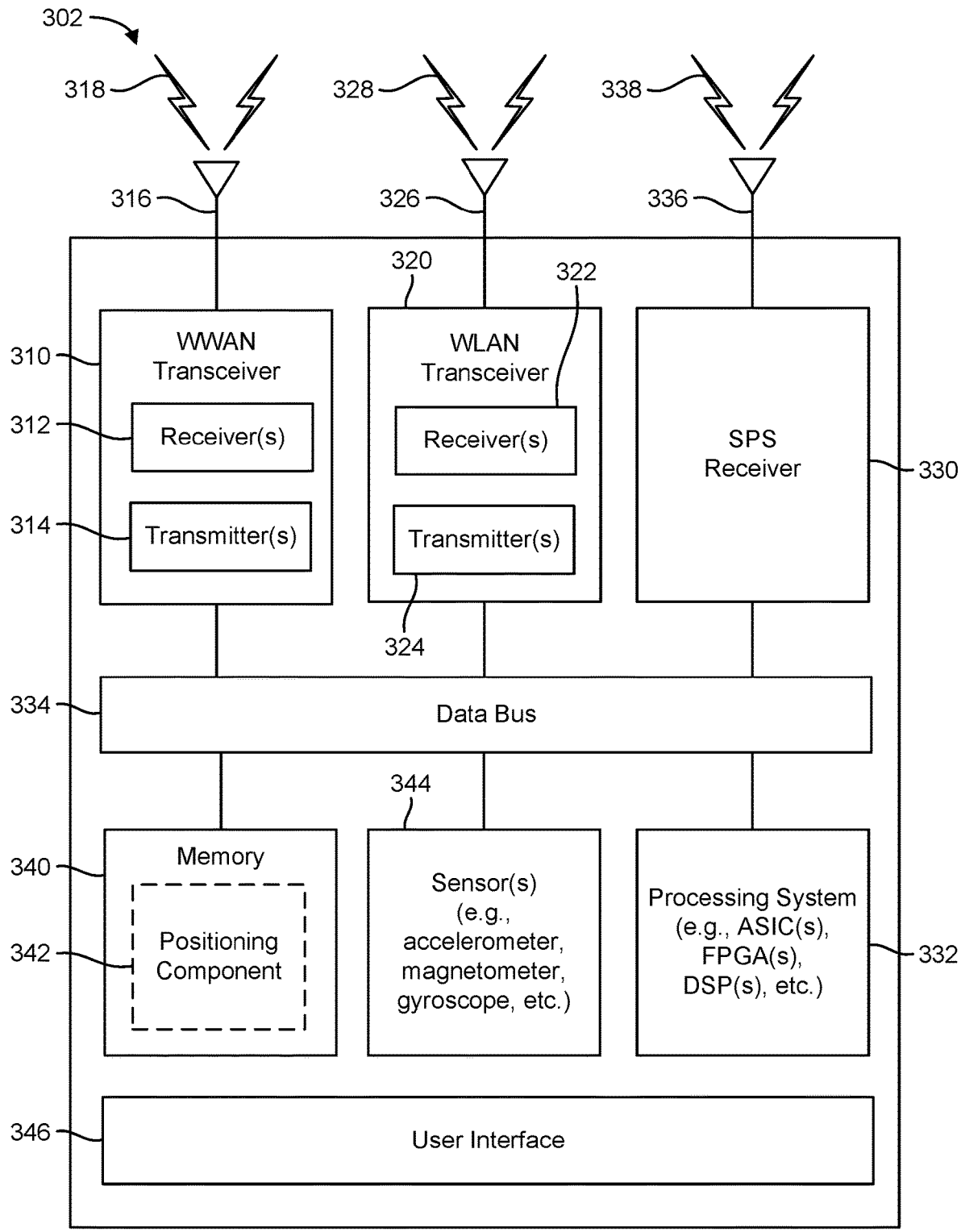
FIGS. 3A to 3C are simplified block diagrams of several sample aspects of components that may be employed in a UE, a base station, and a network entity, respectively.
Figure 3B:
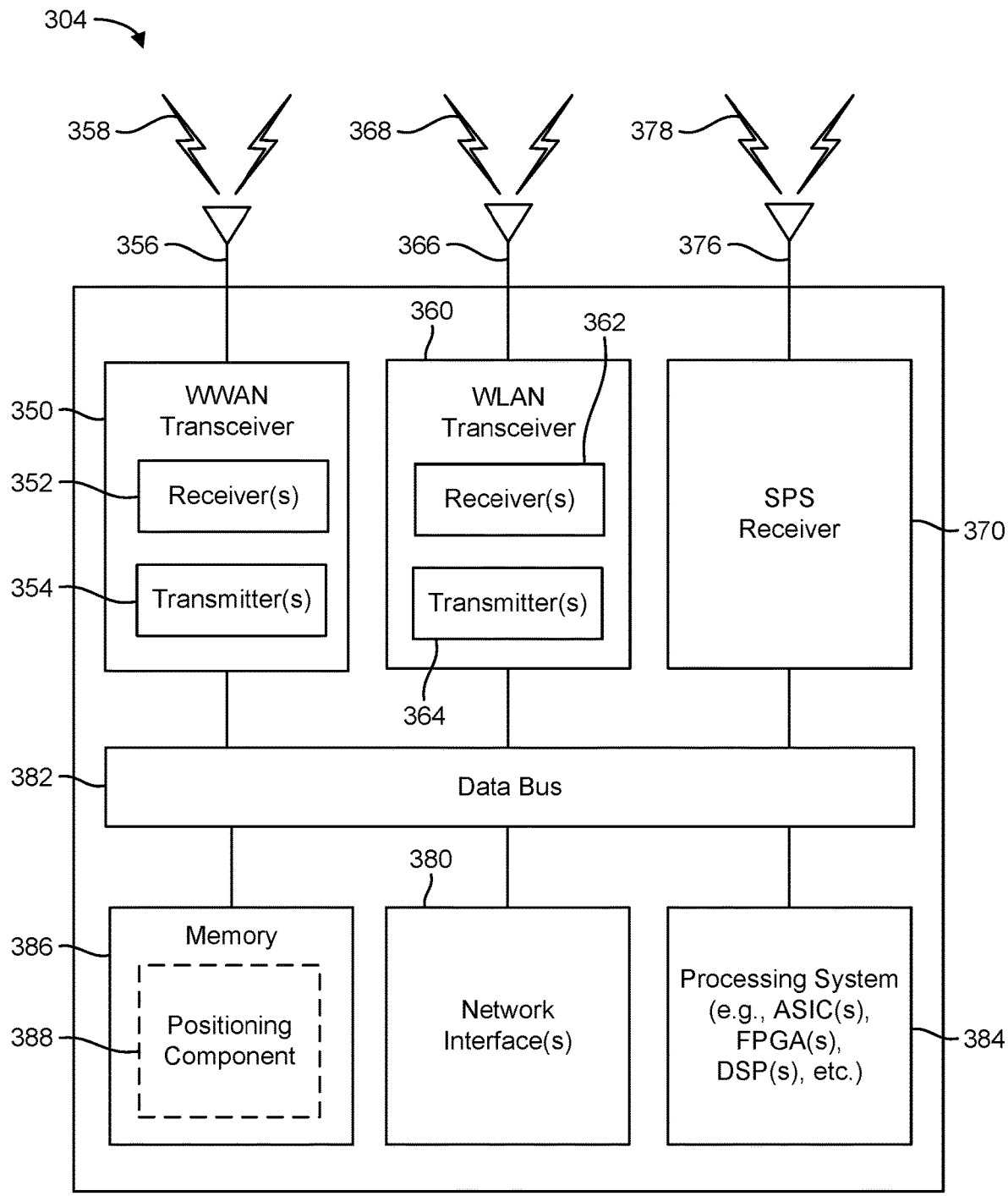
Figure 3C:
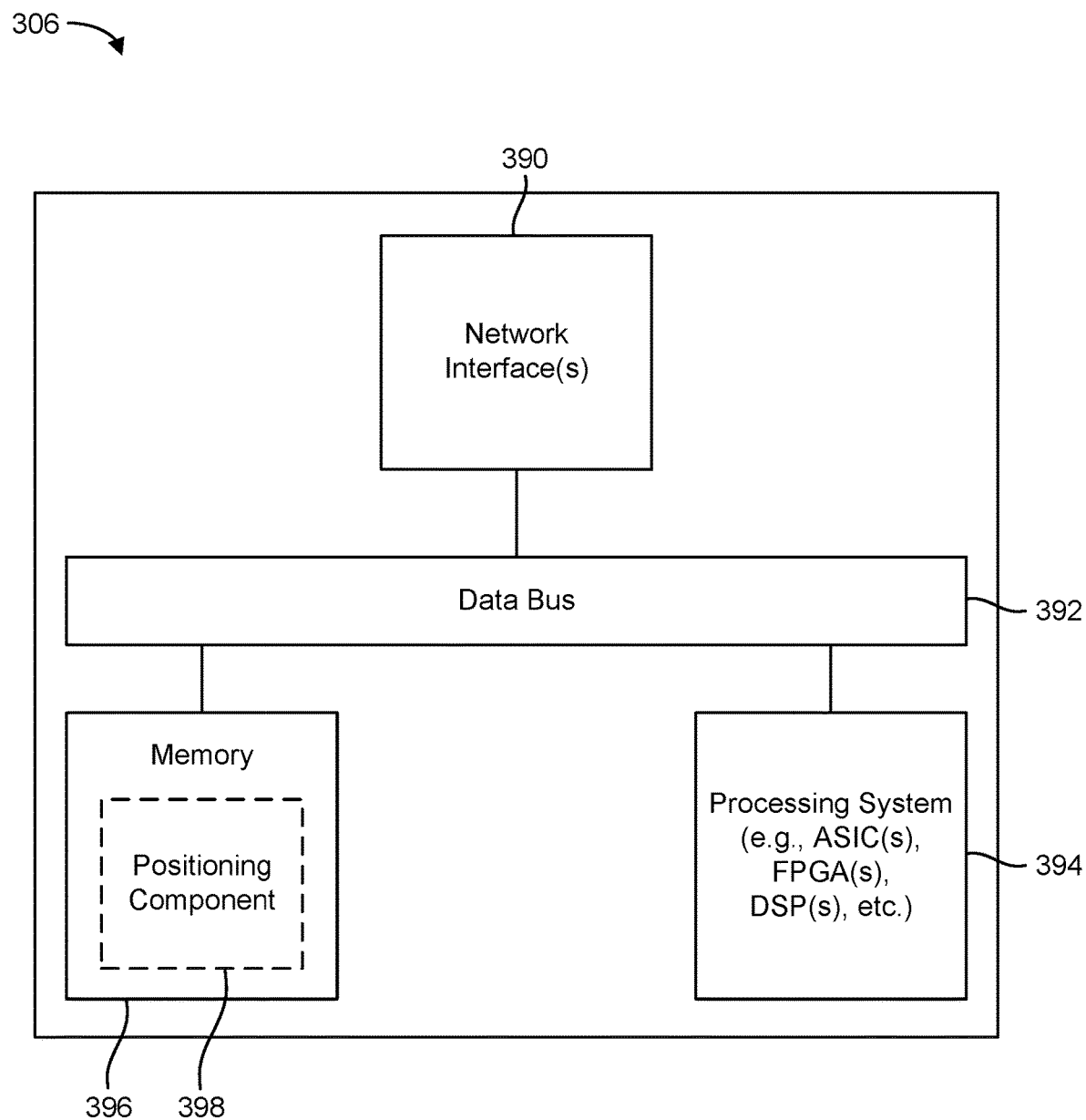

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIGs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
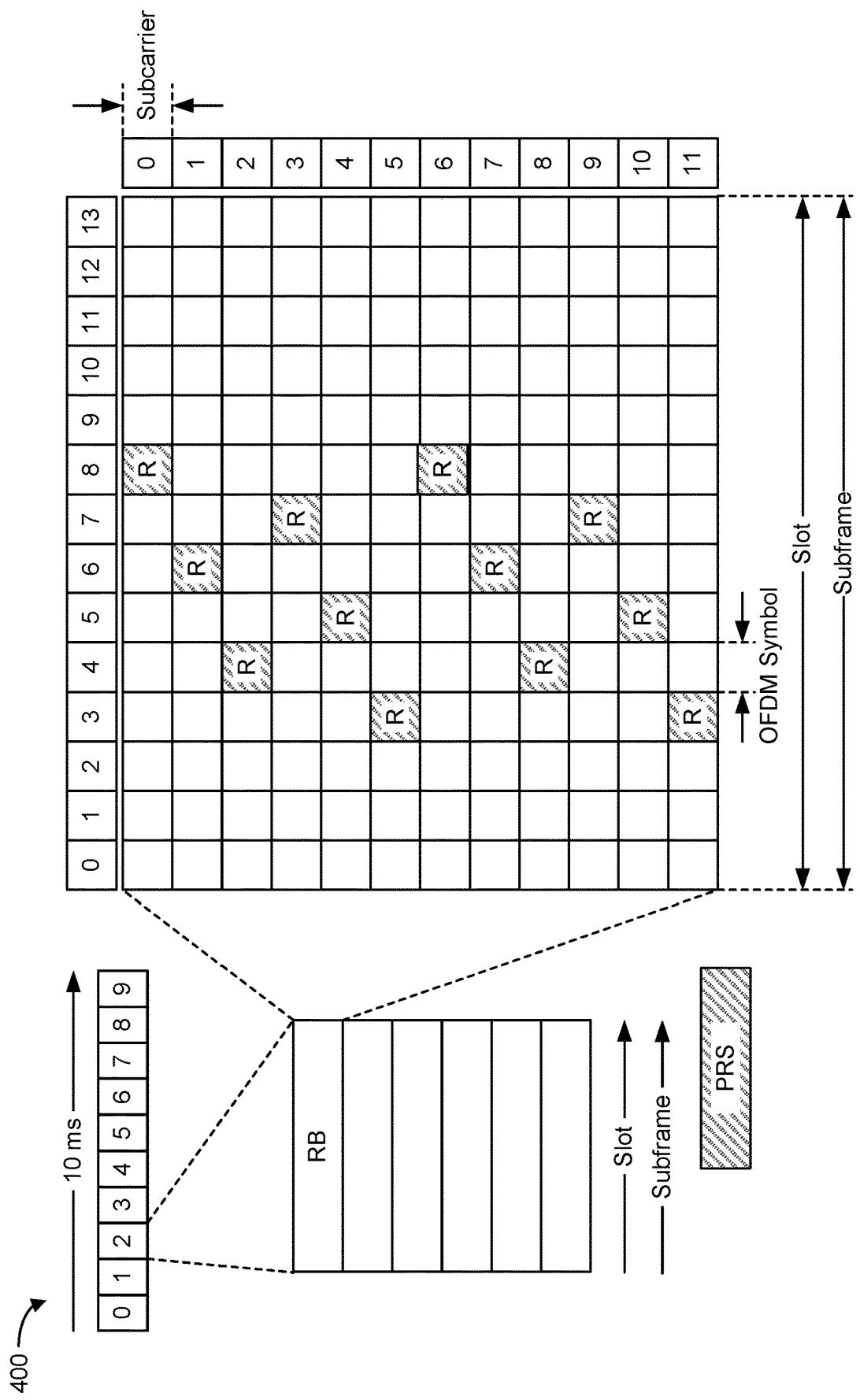
FIGS. 4A to 4D are diagrams illustrating examples of frame structures and channels within the frame structures, according to aspects of the disclosure.
Figure 4B:
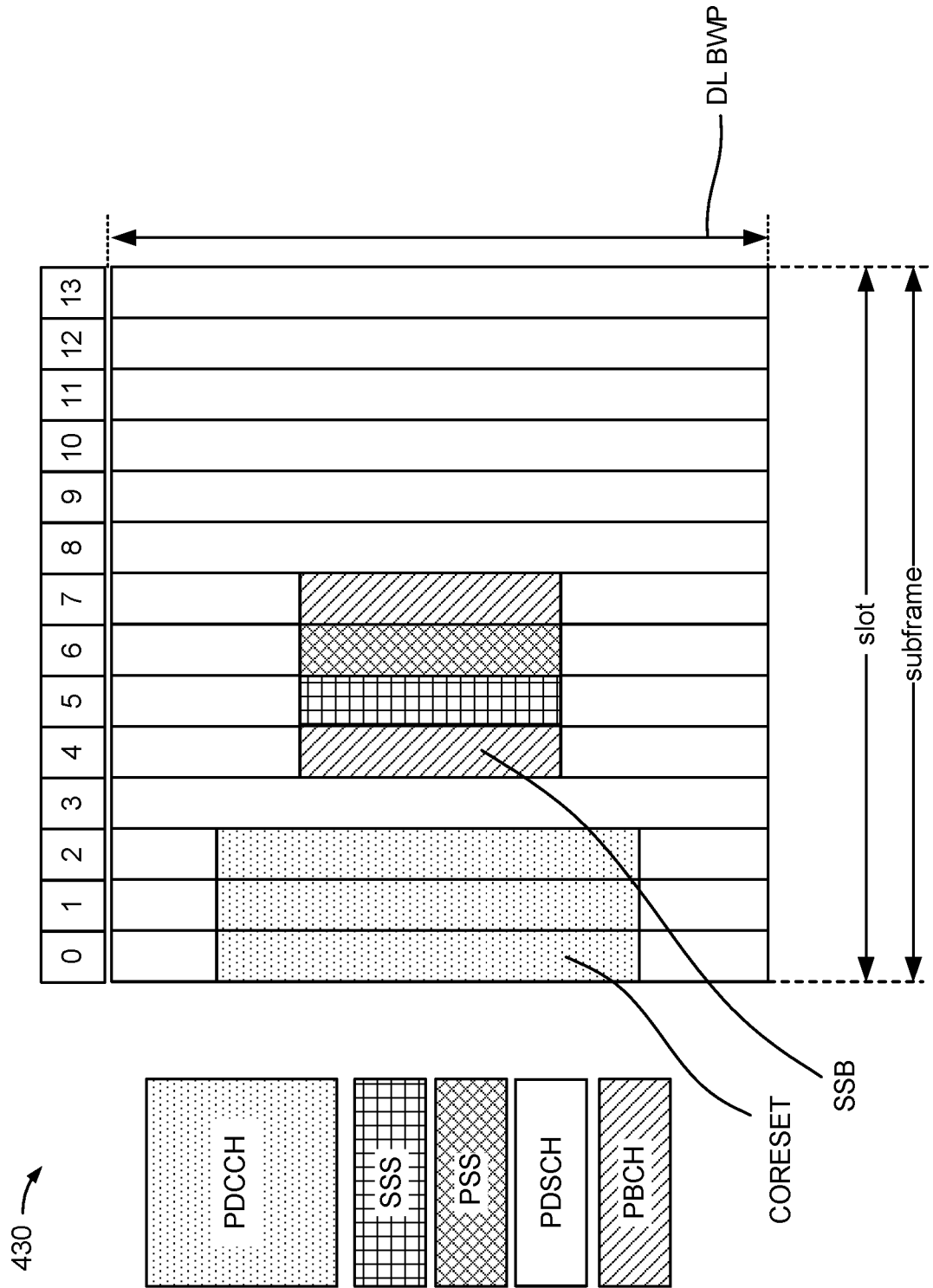
Figure 4C:
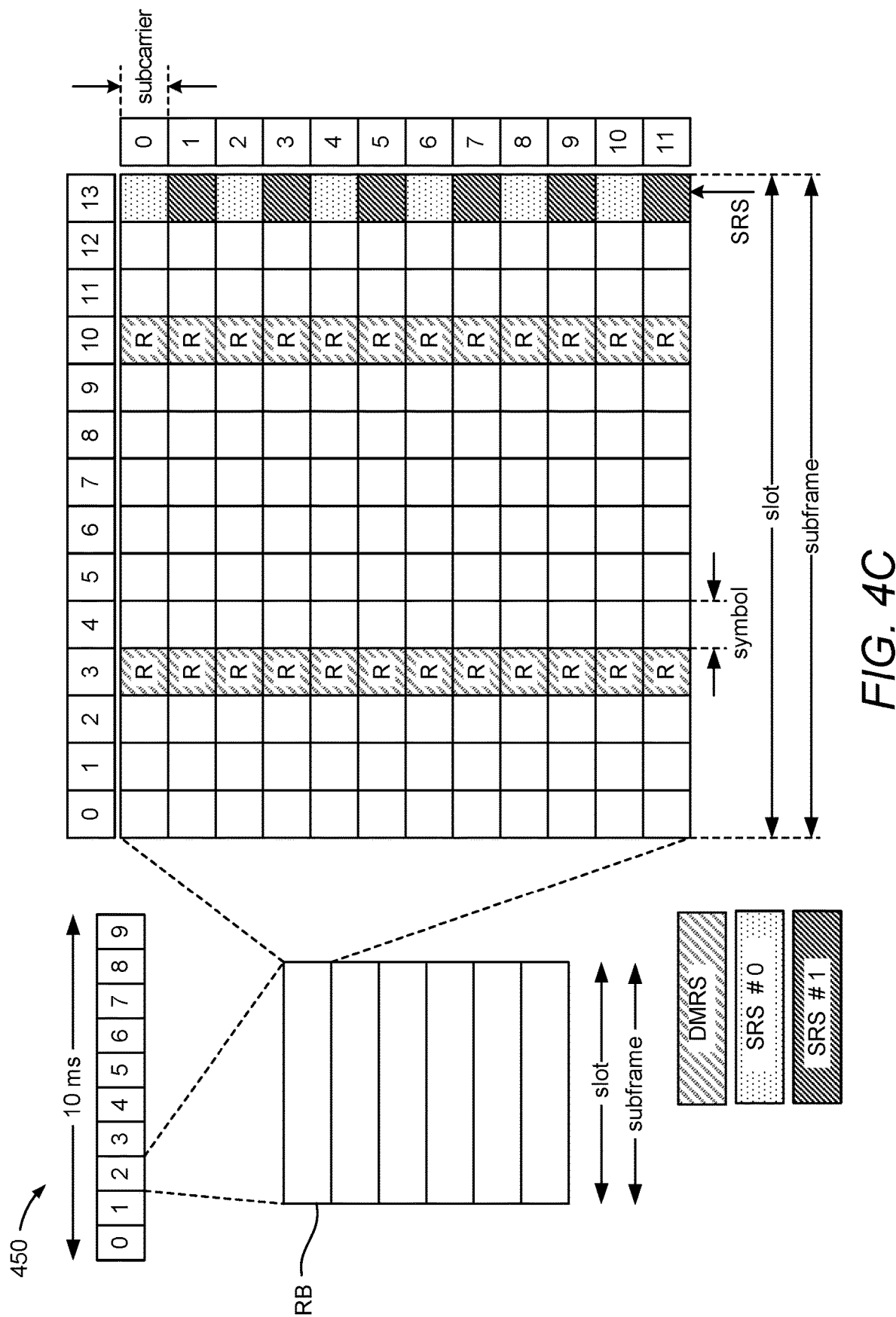
Figure 4D:
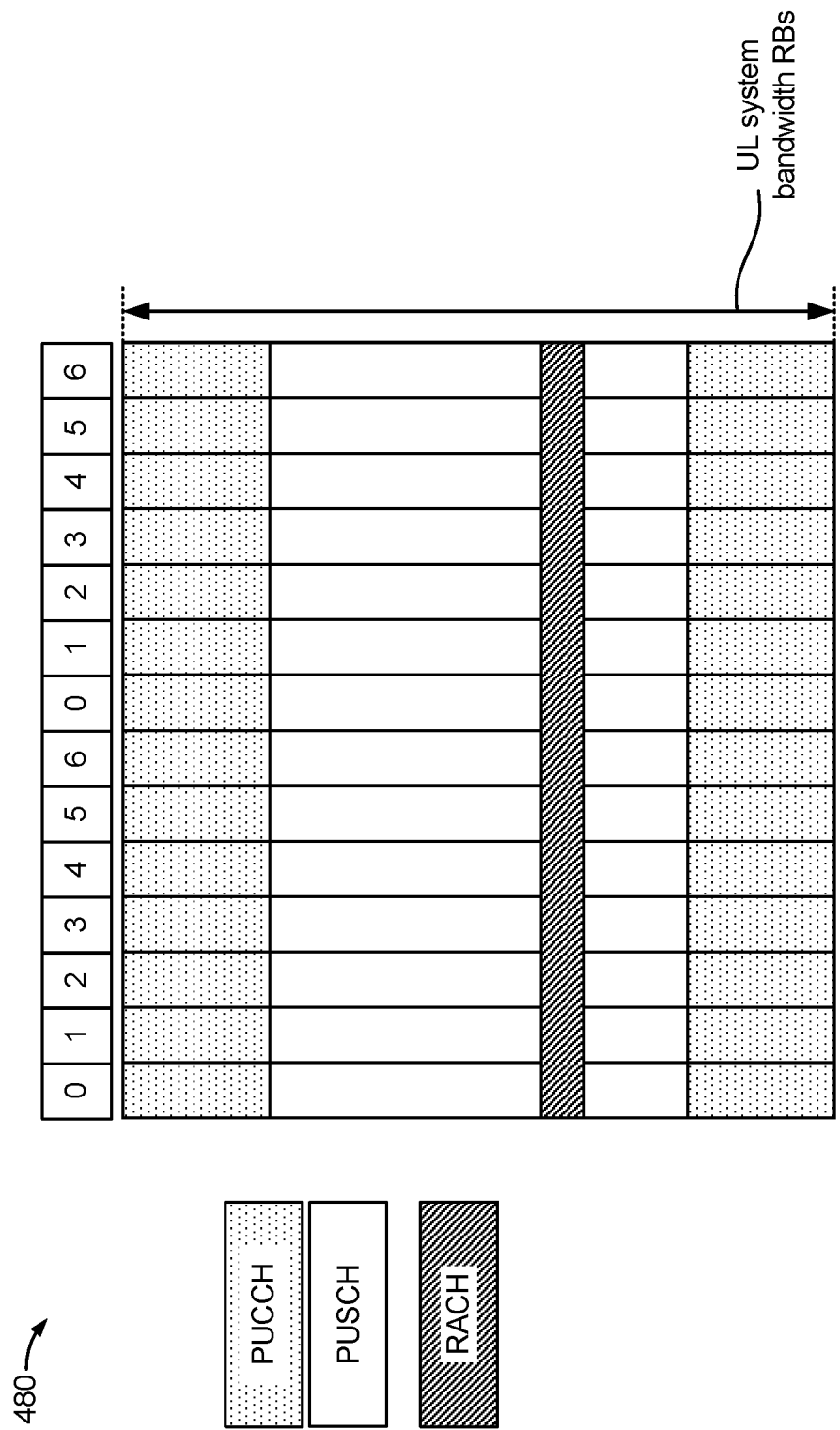

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/Slot | Slots/Sub-frame | Slots/Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A to 4D, a numerology of 15 kHz is used. Thus, in the time domain, a frame (e.g., 10 ms) is divided into 10 equally sized subframes of 1 ms each, and each subframe includes one time slot. In FIGS. 4A to 4D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS in LTE, NRS in 5G, TRS, PTRS, CRS, CSI-RS, DMRS, PSS, SSS, SSB, etc. FIG. 4A illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fours symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length selected from $2^m$. {4, 5, 8, 10, 16, 20, 32, 40, 64, 80, 160, 320, 640, 1280, 2560, 5120, 10240} slots, with $\mu=0, 1, 2, 3$. The repetition factor may have a length selected from {1, 2, 4, 6, 8, 16, 32} slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

As illustrated in FIG. 4C, some of the REs carry DMRS for channel estimation at the base station. The UE may additionally transmit SRS in, for example, the last symbol of a slot. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4C, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UL-TDOA), multi-round-trip-time (multi-RTT), downlink angle-of-arrival (DL-AoA), etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLoss-Reference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS in LTE, NRS in 5G, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In 5G NR, there may not be precise timing synchronization across the network. Instead, it may be sufficient to have coarse time-synchronization across gNBs (e.g., within a cyclic prefix (CP) duration of the OFDM symbols). RTT-based methods generally only need coarse timing synchronization, and as such, are a preferred positioning method in NR.

In a network-centric RTT estimation, the serving base station instructs the UE to scan for/receive the RTT measurement signals from two or more neighboring base stations (and typically the serving base station, as at least three base stations are needed). The one or more base stations transmit RTT measurement signals on low reuse resources (i.e., resources used by the base station to transmit system information) allocated by the network (e.g., location server 230, LMF 270, SLP 272). The UE records the arrival time (also referred to as the receive time, reception time, time of reception, or time of arrival) of each RTT measurement signal relative to the UE's current downlink timing (e.g., as derived by the UE from a downlink signal received from its serving base station), and transmits a common or individual RTT response message to the involved base stations (e.g., when instructed by its serving base station), and may include each of the measured arrival times in a payload of the RTT response message(s).

A UE-centric RTT estimation is similar to the network-based method, except that the UE transmits uplink RTT measurement signal(s) (e.g., when instructed by a serving base station or location server), which are received by multiple base stations in the neighborhood of the UE. Each involved base station responds with a downlink RTT response message, which may include the arrival time of the RTT measurement signal at the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response messages or signals that may include the arrival (or receive) time(s) of the first message(s) or signal(s) in the RTT response message payload.

Figure 5:
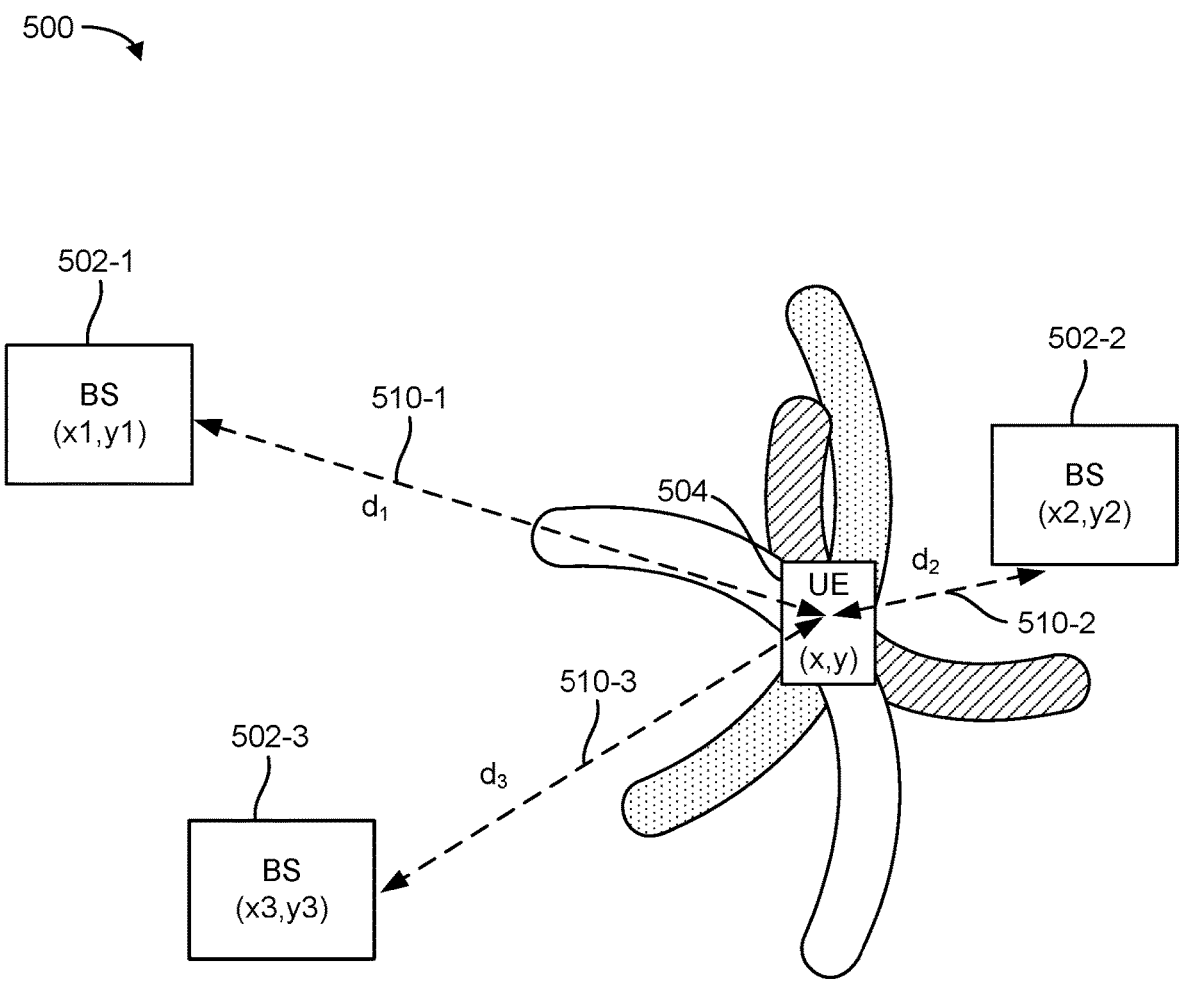
FIG. 5 is a diagram illustrating an exemplary technique for determining a position of a UE using information obtained from a plurality of base stations.

FIG. 5 illustrates an exemplary wireless communications system 500 according to aspects of the disclosure. In the example of FIG. 5, a UE 504 (which may correspond to any of the UEs described herein) is attempting to calculate an estimate of its location, or assist another positioning entity (e.g., a base station or core network component, another UE, a location server, a third party application, etc.) to calculate an estimate of its location. The UE 504 may communicate wirelessly with a plurality of base stations (BS) 502-1, 502-2, and 502-3 (collectively, base stations 502, and which may correspond to any of the base stations described herein) using RF signals and standardized protocols for the modulation of the RF signals and the exchange of information packets. By extracting different types of information from the exchanged signals, and utilizing the layout of the wireless communications system 500 (i.e., the base stations' locations, geometry, etc.), the UE 504 may determine its location, or assist in the determination of its location, in a predefined reference coordinate system. In an aspect, the UE 504 may specify its location using a two-dimensional coordinate system; however, the aspects disclosed herein are not so limited, and may also be applicable to determining locations using a three-dimensional coordinate system, if the extra dimension is desired. Additionally, while FIG. 5 illustrates one UE 504 and three base stations 502, as will be appreciated, there may be more UEs 504 and more base stations 502.

To support location estimates, the base stations 502 may be configured to broadcast reference RF signals (e.g., PRS, NRS, CRS, TRS, CSI-RS, SSB, PSS, SSS, etc.) to UEs 504 in their coverage area to enable a UE 504 to measure characteristics of such reference signals. For example, the UE 504 may measure the time of arrival (ToA) of specific reference signals (e.g., PRS, NRS, CRS, CSI-RS, etc.) transmitted by at least three different base stations 502-1, 502-2, and 502-3 and may use the RTT positioning method to report these ToAs (and additional information) back to the serving base station 502 or another positioning entity (e.g., location server 230, LMF 270, SLP 272).

In an aspect, although described as the UE 504 measuring reference signals from a base station 502, the UE 504 may measure reference signals from one of multiple cells or TRPs supported by a base station 502. Where the UE 504 measures reference signals transmitted by a cell/TRP supported by a base station 502, the at least two other reference signals measured by the UE 504 to perform the RTT procedure would be from cells/TRPs supported by base stations 502 different from the first base station 502 and may have good or poor signal strength at the UE 504.

In order to determine the location (x, y) of the UE 504, the entity determining the location of the UE 504 needs to know the locations of the base stations 502, which may be represented in a reference coordinate system as $(x_k, y_k)$, where k=1, 2, 3 in the example of FIG. 5. Where one of the base stations 502 (e.g., the serving base station) or the UE 504 determines the location of the UE 504, the locations of the involved base stations 502 may be provided to the serving base station 502 or the UE 504 by a location server with knowledge of the network geometry (e.g., location server 230, LMF 270, SLP 272). Alternatively, the location server may determine the location of the UE 504 using the known network geometry.

Either the UE 504 or the respective base station 502 may determine the distance 510 ($d_k$, where k=1, 2, 3) between the UE 504 and the respective base station 502. Specifically, in the example of FIG. 5, the distance 510-1 between the UE 504 and the base station 502-1 is $d_1$, the distance 510-2 between the UE 504 and the base station 502-2 is $d_2$, and the distance 510-3 between the UE 504 and the base station 502-3 is $d_3$. In an aspect, determining the RTT of the RF signals exchanged between the UE 504 and any base station 502 can be performed and converted to a distance 510 ($d_k$). As discussed further below with reference to FIG. 6, RTT techniques can measure the time between sending an RTT measurement signal and receiving an RTT response signal. These methods may utilize calibration to remove any processing delays. In some environments, it may be assumed that the processing delays for the UE 504 and the base stations 502 are the same. However, such an assumption may not be true in practice.

Once each distance 510 is determined, the UE 504, a base station 502, or the location server (e.g., location server 230, LMF 270, SLP 272) can solve for the location (x, y) of the UE 504 by using a variety of known geometric techniques, such as, for example, trilateration. From FIG. 5, it can be seen that the location of the UE 504 ideally lies at the common intersection of three semicircles, each semicircle being defined by radius $d_k$ and center $(x_k, y_k)$, where k=1, 2, 3.

A location estimate (e.g., for a UE 504) may be referred to by other names, such as a position estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 6:
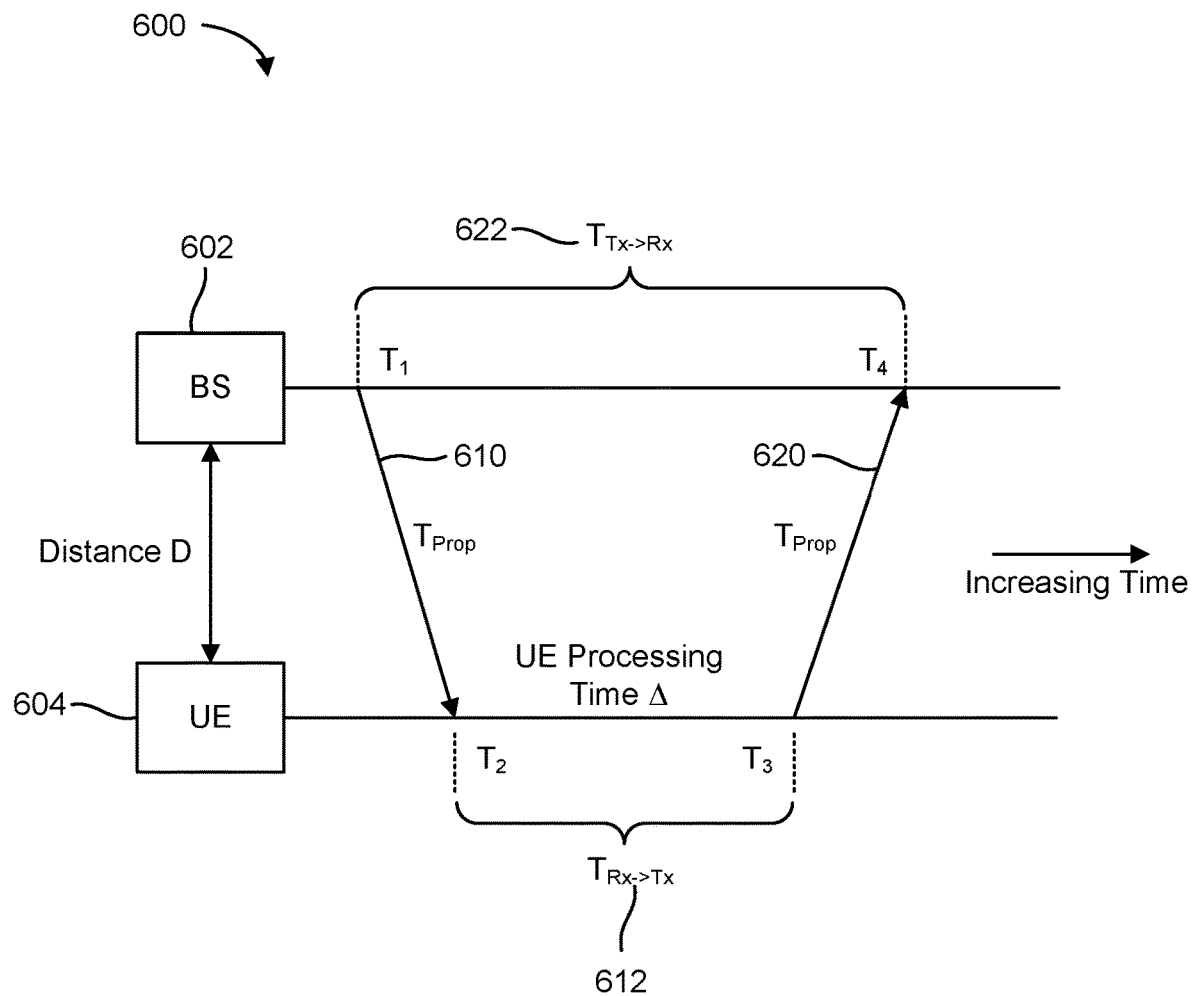
FIG. 6 is a diagram showing exemplary timings of round-trip-time (RTT) measurement signals exchanged between a base station and a UE, according to aspects of the disclosure.

FIG. 6 is an exemplary diagram 600 showing exemplary timings of RTT measurement signals exchanged between a base station 602 (e.g., any of the base stations described herein) and a UE 604 (e.g., any of the UEs described herein), according to aspects of the disclosure. In the example of FIG. 6A, the base station 602 sends an RTT measurement signal 610 (e.g., PRS, NRS, CRS, CSI-RS, etc.) to the UE 604 at time $T_1$. The RTT measurement signal 610 has some propagation delay $T_{Prop}$ as it travels from the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 (e.g., an SRS, UL-PRS, DMRS, etc.) at time $T_3$. After the propagation delay $T_{Prop}$, the base station 602 receives/measures the RTT response signal 620 from the UE 604 at time $T_4$ (the ToA of the RTT response signal 620 at the base station 602).

In order to identify the ToA (e.g., $T_2$) of an RF signal (e.g., an RTT measurement signal 610) transmitted by a given network node, the receiver (e.g., UE 604) first jointly processes all the resource elements (REs) on the channel on which the transmitter (e.g., base station 602) is transmitting the RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the UE 604 may choose a ToA estimate that is the earliest local maximum of the CER that is at least X decibels (dB) higher than the median of the CER and a maximum Y dB lower than the main peak on the channel. The receiver determines the CER for each RF signal from each transmitter in order to determine the ToA of each RF signal from the different transmitters.

The RTT response signal 620 may explicitly include the difference between time $T_3$ and time $T_2$ (i.e., $T_{Rx \to Tx}$ 612), referred to as the "UE Rx-Tx" measurement. Alternatively, it may be derived from the timing advance (TA), i.e., the relative UL/DL frame timing and specification location of uplink reference signals. (Note that the TA is usually the RTT between the base station 602 and the UE 604, or double the propagation time in one direction.) Using this measurement and the difference between time $T_4$ and time $T_1$ (i.e., $T_{Tx \to Rx}$ 622), referred to as the "BS Tx-Rx" measurement, the base station 602 can calculate the distance to the UE 604 as:

$$d = \frac{1}{2c}(T_{Tx \to Rx} - T_{Rx \to Tx}) = \frac{1}{2c}(T_4 - T_1) - \frac{1}{2c}(T_3 - T_2),$$

where c is the speed of light.

As illustrated in FIG. 5, the UE 604 can perform an RTT procedure with multiple base stations 602, referred to as "multi-RTT" or "multi-cell RTT." Such an RTT procedure does not require synchronization between the involved base stations 602. As discussed above with reference to FIG. 5, the UE 604 and the involved base stations 602 report their respective measurements to a positioning entity (e.g., the UE 604, a serving base station 602, a location server, such as location server 230, LMF 270, SLP 272), which calculates an estimate of the location of the UE 604 based on the measurements.

The TA is a MAC control element (MAC-CE) or random-access response (RAR) that is used to control uplink signal transmission timing. A base station (e.g., base station 602) periodically measures the time difference between reception of the PUSCH (see e.g., FIG. 4D), PUCCH (see e.g., FIG. 4D), and/or SRS (see e.g., FIG. 4C) from a UE (e.g., UE 604) and the base station's own frame timing. If needed, the base station can send a TA command to the UE instructing it to change the PUSCH/PUCCH/SRS transmission time to better align with the base station's frame timing. For example, if the PUSCH/PUCCH/SRS arrives at the base station too early, the base station can send a TA command to the UE instructing it to send the PUSCH/PUCCH/SRS some period of time later than it is currently sending it. Alternatively, if the PUSCH/PUCCH/SRS arrives at the base station too late, the base station can send a TA command to the UE instructing it to send the PUSCH/PUCCH/SRS some period of time earlier than it is currently sending it.

To translate each value of a TA command to a physical time delay or timing advance value, the UE performs the following calculation if the TA command is received in a MAC-CE:

$$N_{TA} = N_{TA\_old} + (T_A - 31) \times 16 \times \frac{64}{2^\mu} \quad \text{(Equation 1)}$$

where $N_{TA}$ is the new TA value, $N_{TA\_old}$ is the previous TA value, $T_A$ is an index value (from 0 to 63) from the MAC-CE, and $\mu$ indicates the subcarrier numerology (see Table 1).

If the TA command is received in an RAR, the UE performs the following calculation:

$$N_{TA} = T_A \times 16 \times \frac{64}{2^\mu} \quad \text{(Equation 2)}$$

where $N_{TA}$ is the new TA value, $T_A$ is an index value (from 0 to 3846) from the RAR, and $\mu$ indicates the subcarrier numerology (e.g., from 0 to 3).

Once the UE calculates the new TA value, it performs the following calculation to determine the actual uplink transmission time offset to be applied to the beginning of a subsequent uplink slot:

$$(N_{TA} + N_{TAoffset})T_c \quad \text{(Equation 3)}$$

where $N_{TA}$ is the new TA value as calculated in Equation 1 or Equation 2, $N_{TAoffset}$ depends on the frequency range and band of the cell used for uplink transmission (as shown in Table 2 below), and $T_c$=0.509 nanoseconds (ns).

TABLE 2

| Frequency Range and Band of the Cell Used for Uplink Transmission | $N_{TAoffset}$ (Unit: Tc) |
|---|---|
| FR1 frequency division duplex (FDD) band without LTE-NR coexistence OR FR1 time division duplex (TDD) band without LTE-NR coexistence | 25600 |
| FR1 FDD band with LTE-NR coexistence | 0 |
| FR1 TDD band with LTE-NR coexistence | 39936 or 25600 |
| FR2 | 13792 |

For a TA command received on an uplink slot n, the corresponding adjustment of the uplink transmission timing (as calculated from Equation 3) applies from the beginning of uplink slot n+k, where $k = [N_{slot}^{subframe\mu}(N_{T,1} + N_{T,2} + N_{TAmax} + 0.5)/T_{sf}]$, $N_{T,1}$ is a time duration of $N_1$ symbols corresponding to a PDSCH reception time for PDSCH processing capability 1 when an additional PDSCH DMRS is configured, $N_{T,2}$ is a time duration of $N_2$ symbols corresponding to a PUSCH preparation time for PUSCH processing capability 1, $N_{TAmax}$ is the maximum TA value that can be provided by the TA command field, $N_{slot}^{subframe\mu}$ is a number of slots per subframe, and $T_{sf}$ is the subframe duration of 1 ms.

A TA command may have the following granularity (i.e., the step size of the delay or advance): 521 ns for 15 kHz subcarrier spacing, 260 ns for 30 kHz subcarrier spacing, 130 ns for 60 kHz subcarrier spacing, and 65 ns for 120 kHz subcarrier spacing. That is, for 15 kHz subcarrier spacing, the delay specified by a TA command would be a delay of some multiple (e.g., 1, 2, 3, etc.) of 521 ns.

In some cases, a UE may be configured to receive multiple reference signals (e.g., PRS) from one base station inside a particular radio frame. The UE may further be configured to transmit multiple SRS (which may be part of the same or different component carriers or bands) inside the same frame (e.g., as part of an RTT procedure). For example, during an RTT positioning session, a base station may transmit multiple PRS as the RTT measurement signal (e.g., RTT measurement signal 610) and the UE may respond with multiple SRS as the RTT response signal (e.g., RTT response signal 620). In that case, the UE averages the CER of all of the PRS to determine the time of arrival (e.g., $T_2$ in FIG. 6) of the RTT measurement signal. Similarly, the base station averages the CER of all of the SRS to determine the time of arrival (e.g., $T_4$ in FIG. 6) of the RTT response signal. This averaging of multiple reference signals improves the accuracy of the time of arrival estimates, and thereby, the location estimate. However, if the UE receives a MAC-CE command that changes the TA between the SRS transmissions in a radio frame, it can result in degraded positioning performance.

Figure 7:
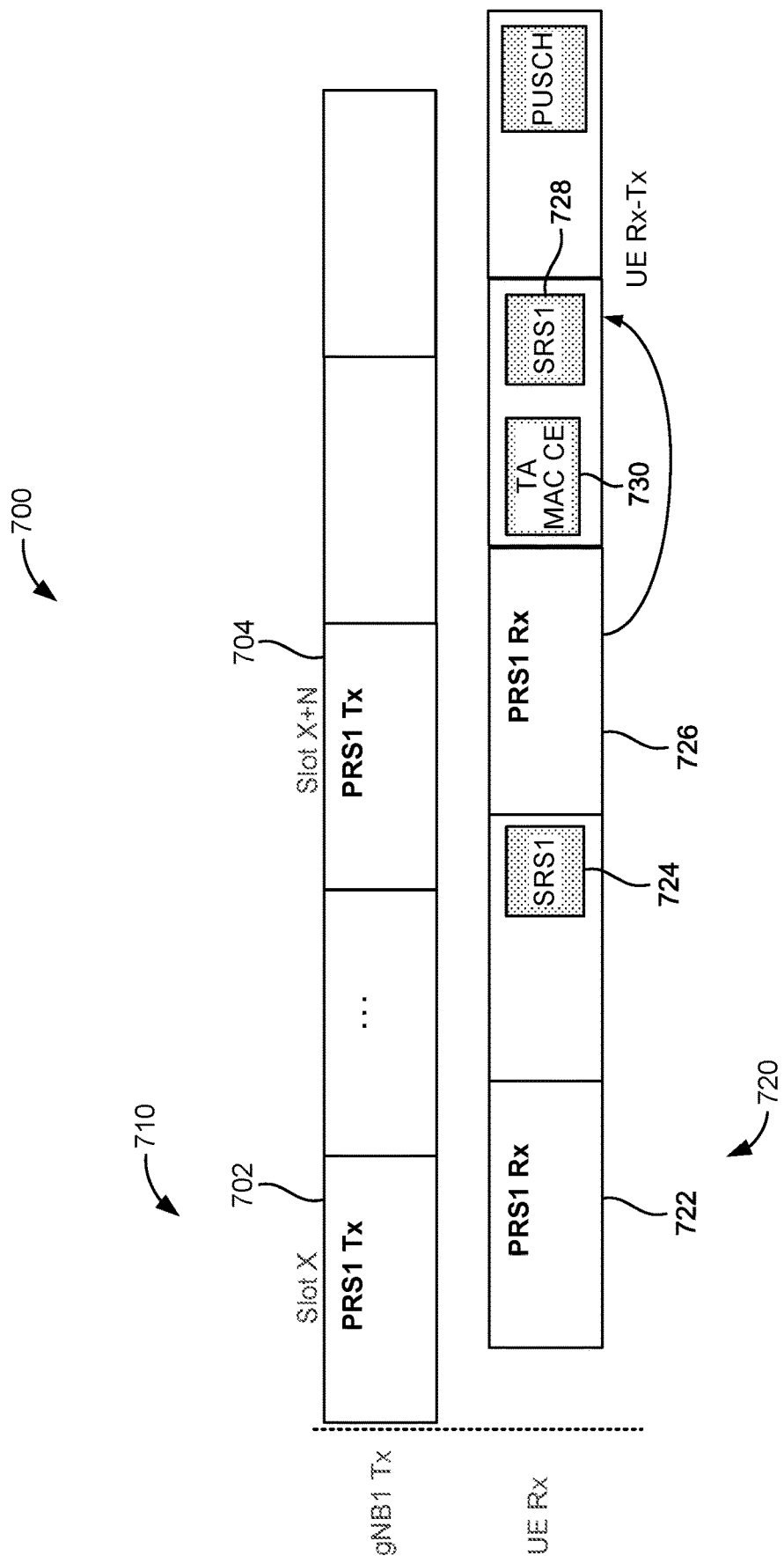
FIG. 7 is a diagram of an exemplary scenario in which a positioning session is interrupted by a timing adjustment command.

FIG. 7 is a diagram 700 of an exemplary scenario in which a positioning session is interrupted by a TA command. In FIG. 7, a base station (labeled "gNB1") transmits multiple PRS (labeled "PRS1") during a radio frame 710, and a UE receives those PRS from the base station during a corresponding radio frame 720. For example, the base station transmits "PRS1" in a first slot 702 (labeled "Slot X") and a second slot 704 (labeled "Slot X+N") of radio frame 710, and the UE receives the "PRS1" in a first slot 722 and a second slot 726, respectively, of a radio frame 720. Because the UE receives "PRS1" as part of a positioning session, the UE transmits an SRS (labeled "SRS1") in a subsequent slot. Thus, in the example of FIG. 7, the UE transmits "SRS1" 724 after receiving "PRS1" in slot 722 and "SRS1" 728 after receiving "PRS1" in slot 726.

As shown in FIG. 7, the UE receives a TA command in a MAC-CE 730 after receiving the "PRS1" in slot 726 and before sending the "SRS1" 728. As will be appreciated, the times of arrival of the "SRS1" 724 and 728 relative to the base station's frame time will be different from each other by at least the amount of the new TA derived from the MAC-CE 730. However, as is apparent, the difference in the times of arrival is not based on a difference in location between the UE and the base station, propagation characteristics of the SRS, or any other relevant factor, but rather, simply the new TA. For example, if the TA command is to add an additional delay to the transmission of uplink signals (e.g., "SRS1"), then for the SRS transmitted after the TA command is applied (e.g., "SRS1" 728), it will appear as if the distance between the UE and the base station is greater than it actually is. As such, simply averaging the times of arrival, or CERs, of the "SRS1" 724 and 728 would result in an inaccurate location estimate. Depending on the granularity/step size of the delay or advance (e.g., 521 ns for 15 kHz subcarrier spacing), the decrease in positioning accuracy can be quite significant. For example, the propagation time between the UE and the base station could appear to be 521 ns longer or shorter than it actually is.

There are various options for what the UE can report as the UE Rx-Tx measurement (e.g., $T_{Rx \rightarrow Tx}$ 612) if a TA command is received during a positioning session. In LTE, the specified/requested positioning accuracy for the positioning session is not guaranteed to be met if a TA command is received during a positioning session. As a first option, the UE may timestamp each UE Rx-Tx measurement at the slot level with respect to the reference cell (or serving cell). As a second option, the timestamp of each UE Rx-Tx measurement may be such that the UE reports the following tuple of information: {slot ID in which PRS is received, slot ID in which SRS is transmitted}. As a third option, the reported UE Rx-Tx measurement may refer to the latest or earliest measurement inside the reported frame. As a fourth option, the UE may not apply the TA command to SRS used only for positioning, but may instead apply it for the remaining uplink channels. In this case, there would likely need to be gaps between the SRS-for-positioning and the uplink channels in the adjacent OFDM symbols. However, it is possible that the gaps may not be needed if the TA is small enough (e.g., within the size of the CP) to perform via a phase-ramp in the frequency domain (circular shift). Alternatively, the gaps may not be needed if the TA can be covered by the existing downlink-to-uplink switch gap (at the end of the slot for SRS). This may hold only for certain values of the TA command, and the gap configuration could be a function of the TA command. If the SRS is used for both positioning and communications, then the UE may be expected to apply the TA command as specified by the serving cell.

All of these options enable the base station or other positioning entity (e.g., location server 230, LMF 270, SLP 272) to exclude CERs of the SRS received after the TA command is applied from being averaged with the CERs of SRS received before the TA command is applied. While this may improve positioning performance over calculating an average of all SRS, there may not be very many SRS transmitted in a positioning session, and therefore, the base station not being able to average the CERs of all SRS can still result in poor positioning performance.

The foregoing options have additional drawbacks. For example, these options would result in high operational constraints that may not be acceptable for 5G NR, especially in mobility (i.e., handover) cases. In addition, the requested positioning accuracy for UL-TDOA or multi-RTT positioning methods may only be guaranteed if a TA command is not received during a positioning session. Regarding the second and third options above specifically, if the UE adds a timestamp with a larger granularity of the time period during which the SRS transmission is valid, it would mean that the receiving base station (especially neighboring base stations) (1) would not be able to average the received SRS across different slots, since it would not know how much the CER of the new SRS is shifted in time, and (2) would only be able to perform one-shot measurements and then forward them to the positioning entity.

The present disclosure proposes signaling aspects to ensure that both serving and neighboring base stations are able to compensate for different uplink timings of SRS, average the CERs of the SRS, and then derive the subsequent positioning measurements, such as the received time of arrival (RTOA) (e.g., $T_4$ in FIG. 6) or the BS Tx-Rx measurement (e.g., $T_{Tx \rightarrow Rx}$ 622 in FIG. 6). For example, the present disclosure provides techniques for the UE to report the applied SRS adjustment(s) within a measurement window.

During a configured measurement window, if the UE transmits SRS with different uplink timing (due to the reception of a TA command), then the UE can include a report in an uplink channel (e.g., PUSCH or PUCCH) indicating the timing adjustment of the corresponding SRS in the measurement window. As a first option, this information may be received by the serving base station and then distributed to the neighboring base stations through the Xn interface. In that way, all of the involved base stations can adjust their SRS reception times and average the adjusted SRS CERs to obtain the RTOA or the BS Tx-Rx measurements. As a second option, this information may be received by the positioning entity (e.g., the serving base station, a location server), and the positioning entity can distribute it to the involved base stations, which can use the information to adjust the SRS reception timing. Then, the base stations can forward the RTOAs of the SRS to the positioning entity.

In an aspect, the measurement window can correspond to a positioning session, a radio frame, a collection of frames, a subframe, a collection of subframes, a slot, a collection of slots, a collection of consecutive SRS transmissions from the UE (e.g., 10 SRS transmissions), or the like. The UE can be configured with this measurement window through higher layer signaling (e.g., LTE positioning protocol (LPP), RRC). If no timing adjustment to the SRS transmissions is performed inside the measurement window, the UE can report "0" as the needed adjustment, or may not report any number.

In an aspect, the timing adjustment of SRS transmissions need only be reported if the requested positioning accuracy is larger than a specified (threshold) value. The threshold value could be dependent on the system numerology (see Table 1). Alternatively, or additionally, the threshold value could be dependent on the granularity of the reporting of the UE Rx-Tx measurement. For example, if the UE Rx-Tx measurement is reported with a granularity of 'X' ns, then, if the SRS is adjusted with a TA that results in a change of much less than 'X' ns, there would be no need to report the SRS timing adjustment. However, if SRS transmission is adjusted by only a small amount (e.g., some 'Y' much less than 'X'), but after several such adjustments, the total adjustment is comparable to 'X,' then a cumulative value could be reported, possibly with a report of the window of time over which that cumulative adjustment was distributed.

In an aspect, the reporting of the timing adjustment could be discretized to match the corresponding TA command. For example, there may be a TA step size of 16×64/2µ, in NR. Thus, the reported timing adjustment to SRS transmissions would match the value of the corresponding TA command. In this case, the report may include 'Z' bits to cover the cases $\{-2^{z/2}, \ldots, 2^{z/2}-1\}$. In an aspect, each 'Z' bits can indicate that the current SRS transmission has been adjusted with respect to the previous SRS transmission. Alternatively, each 'Z' bits can indicate that the SRS transmission has been adjusted with respect to the first SRS transmission in the measurement window.

In an aspect, the timing adjustment may be reported with a single bit. In an aspect, the report for a measurement window may include one bit per SRS transmission (or slot/subframe/frame ID) inside the measurement window. As a first option, this bit can indicate that the Ath' SRS has been adjusted with respect to the previous SRS. For example, given 10 SRS transmissions in the measurement window and a TA command applied after the sixth SRS transmission, the report may include six '0' bits for the first six SRS transmissions, followed by one '1' bit for the first SRS transmission transmitted after the new TA is applied, followed by three '0' bits indicating no further TA change from the previous (seventh) SRS transmission. As a second option, this bit can indicate that the 'Xth' SRS has been adjusted with respect to the first SRS in the measurement window. For example, given 10 SRS transmissions in the measurement window and a TA command applied after the sixth SRS transmission, the report may include six '0' bits for the first six SRS transmissions, followed by four '1' bits for the remaining SRS transmissions.

In an alternative aspect, the report may include one bit for all of the SRS transmissions in the measurement window, indicating whether or not at least one SRS in the measurement window was adjusted. For example, given 10 SRS transmissions in the measurement window and a TA command applied after the sixth SRS transmission, the report may be a single bit set to '1.' In this way, a report indicating that a second timing adjustment parameter has been applied to a second SRS indicates that the second timing adjustment associated with the second SRS is different than a first timing adjustment associated with a first SRS.

In an aspect, the UE could report a set of SRS indexes indicating when the reported SRS transmission timing changed. The likelihood that the UE receives more than some number 'X' (e.g., 1, 2, 3, etc.) TA commands during a measurement window is small. As such, the UE would only need to report up to 'X' SRS index values (or slot/subframe/frame indexes) corresponding to the first SRS transmitted after the timing adjustment is applied. For example, given 10 SRS transmissions in the measurement window and a TA command applied after the third and sixth SRS transmissions, the report may include the index values for the fourth and seventh SRS transmissions (i.e., the first SRS transmissions after the TA commands were received).

In an aspect, when the UE does not report the exact value of the SRS timing adjustment applied (and it only reports whether or not the SRS transmission timing has been adjusted), then the base station may assume that up to a specific timing adjustment was applied. For example, the maximum timing adjustment may be one TA step (e.g., 521 ns for 15 KHz subcarrier spacing) or 'Z' (e.g., 2, 3, etc.) TA steps. 'Z' may also be reported by the UE separately or in the same report.

In an aspect, the serving base station may forward the TA commands to the neighboring base stations. However, the UE may not apply the TA command for some number of subsequent SRS transmissions since it may miss the TA command or because it has simply not applied it yet. To address this issue, the neighboring base stations can perform some implementation-based solutions, such as a blind check of whether or not the TA command was applied, to attempt to average the SRS measurements correctly. The UE may still report information on whether/which SRS transmissions are affected, as described above. Together with the TA information received from the serving base station, the neighboring base station(s) may combine these two different information sources to obtain the exact timing of the SRS transmissions.

In an aspect, the SRS transmission timing can be adjusted due to the reception of an explicit TA command, as described in the foregoing, or due to autonomous UE correction based on the UE sensing a change in the downlink timing. The reporting solutions described above apply in both cases. The same solution can be used because, although the TA command is known to the base station that issues it, there is no precise action-time specified for when the UE will apply it. In addition, the UE may spread out the application of the TA over several slots, so it may be hard for the base station to detect.

Figure 8:
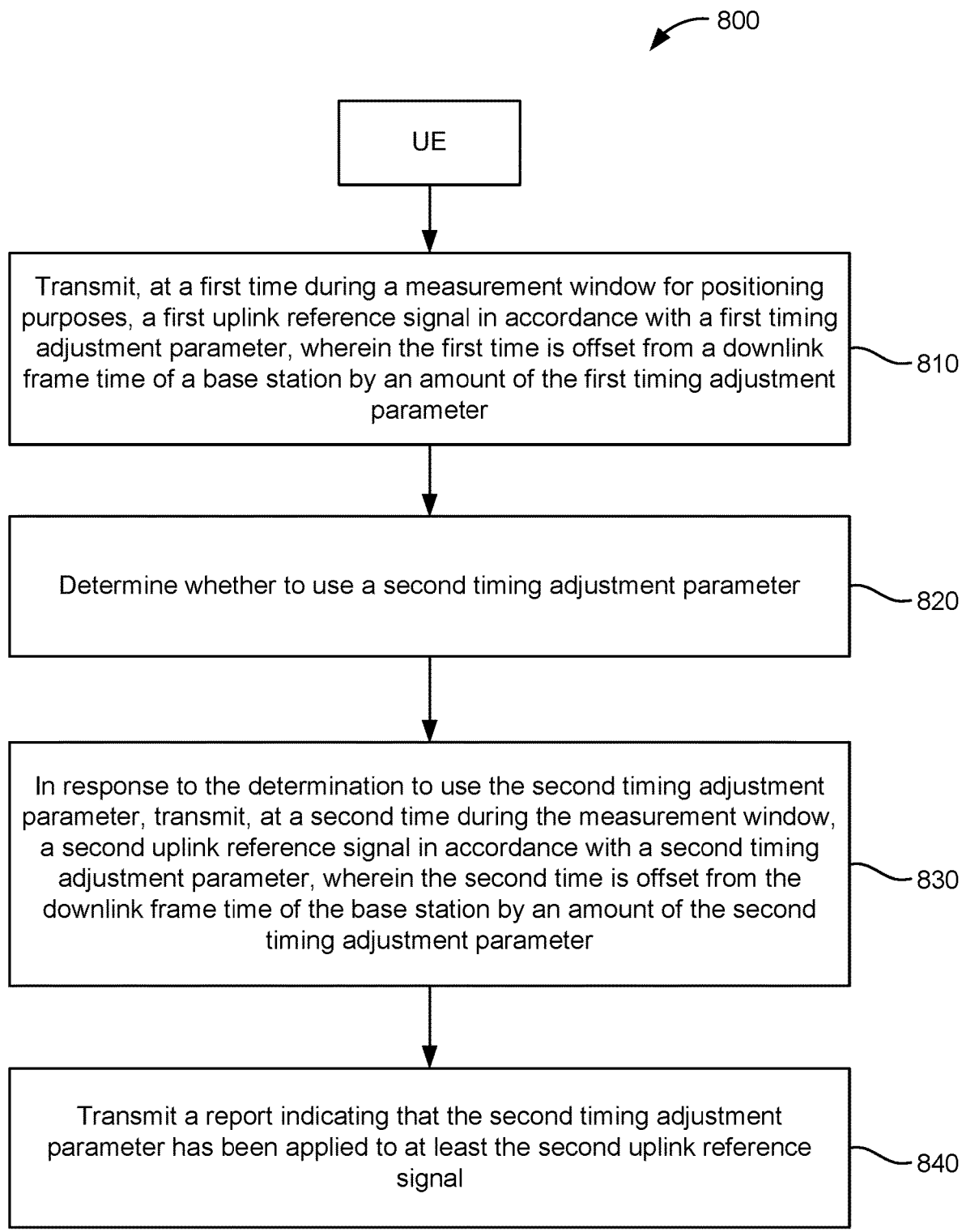
FIGS. 8 and 9 illustrate exemplary methods of wireless communication, according to aspects of the disclosure.

FIG. 8 illustrates an exemplary method 800 of wireless communication, according to aspects of the disclosure. In an aspect, the method 800 may be performed by any of the UEs described herein.

At 810, the UE transmits, at a first time during a measurement window for positioning purposes, a first uplink reference signal in accordance with a first timing adjustment parameter, wherein the first time is offset from a downlink frame time (e.g., the start of reception of a downlink radio frame) of a base station (e.g., any of the base stations described herein) by an amount of the first timing adjustment parameter. In an aspect, operation 810 may be performed by WWAN transceiver 310, processing system 332, memory component 340, and/or positioning component 342, any or all of which may be considered means for performing this operation.

At 820, the UE determines whether to use a second timing adjustment parameter. In an aspect, operation 820 may be performed by WWAN transceiver 310, processing system 332, memory component 340, and/or positioning component 342, any or all of which may be considered means for performing this operation.

At 830, the UE transmits, in response to the determination to use the second timing adjustment parameter, at a second time during the measurement window, a second uplink reference signal in accordance with a second timing adjustment parameter, wherein the second time is offset from the downlink frame time of the base station by an amount of the second timing adjustment parameter. In an aspect, operation 830 may be performed by WWAN transceiver 310, processing system 332, memory component 340, and/or positioning component 342, any or all of which may be considered means for performing this operation.

At 840, the UE transmits a report indicating that the second timing adjustment parameter has been applied to at least the second uplink reference signal. In an aspect, there may not have been any timing adjustment changes, and the report may indicate that there have been no changes. In an aspect, operation 840 may be performed by WWAN transceiver 310, processing system 332, memory component 340, and/or positioning component 342, any or all of which may be considered means for performing this operation.

Figure 9:
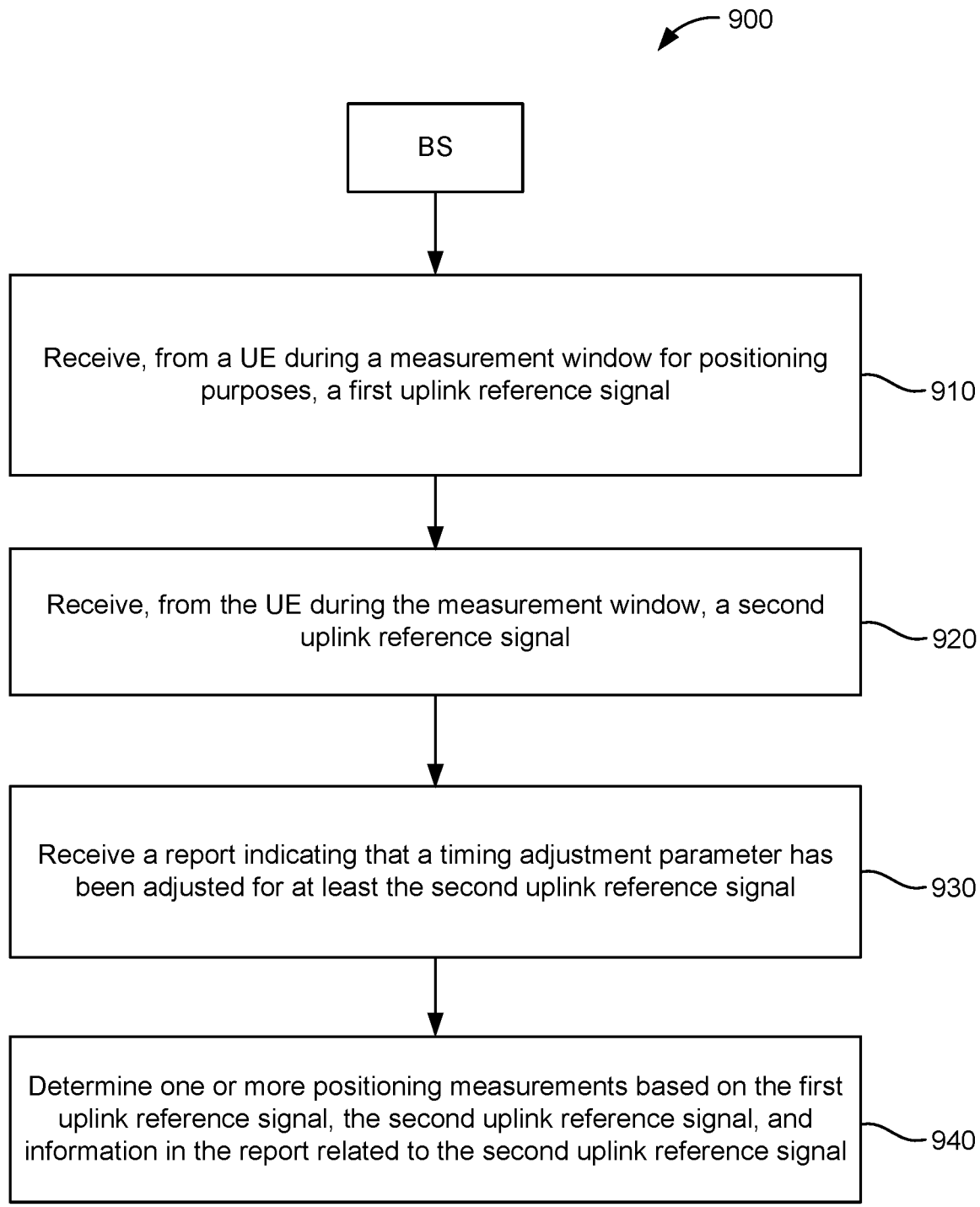

FIG. 9 illustrates an exemplary method 900 of wireless communication, according to aspects of the disclosure. In an aspect, the method 900 may be performed by any of the base stations described herein.

At 910, the base station receives, from a UE (e.g., any of the UEs described herein) during a measurement window for positioning purposes, a first uplink reference signal. In an aspect, operation 910 may be performed by WWAN transceiver 350, processing system 384, memory component 386, and/or positioning component 388, any or all of which may be considered means for performing this operation.

At 920, the base station receives, from the UE during the measurement window, a second uplink reference signal. In an aspect, operation 920 may be performed by WWAN transceiver 350, processing system 384, memory component 386, and/or positioning component 388, any or all of which may be considered means for performing this operation.

At 930, the base station receives a report indicating that a timing adjustment parameter has been adjusted for at least the second uplink reference signal. In an aspect, operation 930 may be performed by WWAN transceiver 350, processing system 384, memory component 386, and/or positioning component 388, any or all of which may be considered means for performing this operation.

At 940, the base station determines one or more positioning measurements based on the first uplink reference signal, the second uplink reference signal, and information in the report related to the second uplink reference signal. In an aspect, operation 940 may be performed by WWAN transceiver 350, processing system 384, memory component 386, and/or positioning component 388, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
 a memory;
 at least one transceiver; and
 at least one processor communicatively coupled to the memory and the at least one transceiver, the at least one processor configured to:
  cause the at least one transceiver to transmit, at a first time during a measurement window for positioning purposes, a first uplink reference signal in accordance with a first timing adjustment parameter, wherein the first time is offset from a downlink frame time of a base station by an amount of the first timing adjustment parameter; and
  cause the at least one transceiver to transmit, after transmission of the first uplink reference signal, a first report indicating that the first timing adjustment parameter has been applied to at least the first uplink reference signal, wherein the first report includes an offset parameter $N_{TAoffset}$ associated with the first timing adjustment parameter, and wherein a value of the offset parameter $N_{TAoffset}$ is based on a frequency range in which the first uplink reference signal is transmitted.

2. The UE of claim 1, wherein the at least one processor is further configured to:
 determine whether to use a second timing adjustment parameter;
 in response to the determination to use the second timing adjustment parameter, cause the at least one transceiver to transmit, at a second time during the measurement window, a second uplink reference signal in accordance with the second timing adjustment parameter, wherein the second time is offset from the downlink frame time of the base station by an amount of the second timing adjustment parameter; and
 cause the at least one transceiver to transmit a second report indicating that the second timing adjustment parameter has been applied to at least the second uplink reference signal.

3. The UE of claim 2, wherein:
 the at least one processor being configured to determine comprises the at least one processor being configured to detect, during the measurement window, a change in downlink timing,
 the second uplink reference signal is transmitted in accordance with the second timing adjustment parameter in response to detection of the change in downlink timing.

4. The UE of claim 2, wherein the at least one processor is further configured to:
 receive, from the base station via the at least one transceiver, a first downlink reference signal, wherein the first uplink reference signal is associated with the reception of the first downlink reference signal;
 receive, from the base station via the at least one transceiver, a second downlink reference signal, wherein the second uplink reference signal is associated with the reception of the second downlink reference signal; and
 report, to the base station, a difference between a time of reception of the second downlink reference signal and the second time.

5. The UE of claim 4, wherein, based on a determination that the amount of the second timing adjustment parameter is less than a threshold related to the difference between a time of reception of the second downlink reference signal and the second time, the at least one processor refrains from causing the at least one transceiver to transmit a report indicating that a timing adjustment parameter has been applied to an uplink reference signal.

6. The UE of claim 1, wherein the at least one processor causes the at least one transceiver to transmit the first report on an uplink channel other than a channel on which the first reference signal is transmitted.

7. The UE of claim 1, wherein the first report includes the amount of the first timing adjustment parameter.

8. The UE of claim 2, wherein the first uplink reference signal and the second uplink reference signal are transmitted on different component carriers and/or different bands.

9. The UE of claim 1, wherein the first report includes one bit per uplink reference signal transmitted during the measurement window to indicate which uplink reference signals transmitted during the measurement window have transmission times that were changed.

10. The UE of claim 9, wherein each bit of the first report indicates whether or not a transmission timing of an uplink reference signal transmitted during the measurement window was changed up to a threshold from a transmission timing of a preceding uplink reference signal transmitted during the measurement window.

11. The UE of claim 10, wherein the threshold comprises a granularity of the first timing adjustment parameter.

12. The UE of claim 11, wherein:
 the threshold comprises a multiple of the granularity of the first timing adjustment parameter, and
 the at least one processor is further configured to cause the at least one transceiver to transmit the multiple in the first report.

13. The UE of claim 9, wherein each bit of the first report indicates whether or not a transmission timing of an uplink reference signal transmitted during the measurement window was changed up to a threshold from a transmission timing of a first-occurring uplink reference signal transmitted during the measurement window.

14. The UE of claim 1, wherein the first report comprises one bit indicating whether or not a transmission timing of any uplink reference signal transmitted during the measurement window was changed up to a threshold from a transmission timing of a first-occurring uplink reference signal transmitted during the measurement window.

15. The UE of claim 1, wherein the first report comprises one or more index values identifying which uplink reference signals transmitted during the measurement window have a transmission timing that is different from previous uplink reference signals transmitted during the measurement window.

16. The UE of claim 1, wherein:
the first report includes one or more positioning measurements derived based on the first uplink reference signal, and
the first report indicating that the first timing adjustment parameter has been applied to at least the first uplink reference signal comprises the first report indicating that the first timing adjustment has been applied to less than all of the one or more positioning measurements that were derived using at least the first uplink reference signal.

17. A base station, comprising:
a memory;
at least one transceiver; and
at least one processor communicatively coupled to the memory and the at least one transceiver, the at least one processor configured to:
receive, from a user equipment (UE) during a measurement window for positioning purposes, a first uplink reference signal;
receive, from the UE during the measurement window, a second uplink reference signal;
receive, via the at least one transceiver, after reception of the second uplink reference signal, a report indicating that a timing adjustment parameter has been adjusted for at least the second uplink reference signal, wherein the report includes an offset parameter $N_{TAoffset}$ associated with the timing adjustment parameter, and wherein a value of the offset parameter $N_{TAoffset}$ is based on a frequency range in which the second uplink reference signal is transmitted; and
determine one or more positioning measurements based on the first uplink reference signal, the second uplink reference signal, and information in the report related to the second uplink reference signal.

18. The base station of claim 17, wherein the at least one processor being configured to determine comprises the at least one processor being configured to determine the one or more positioning measurements by jointly processing the first uplink reference signal and the second uplink reference signal based on the information in the report related to the second uplink reference signal.

19. The base station of claim 18, wherein the at least one processor being configured to jointly process comprises the at least one processor being configured to:
adjust a time of arrival of the second uplink reference signal based on the information in the report; and
combine the adjusted time of arrival of the second uplink reference signal and a time of arrival of the first uplink reference signal to perform a positioning measurement.

20. The base station of claim 17, wherein the at least one processor is further configured to:
cause the at least one transceiver to transmit, to the UE, a first downlink reference signal, wherein the first uplink reference signal is associated with the transmission of the first downlink reference signal; and
cause the at least one transceiver to transmit, to the UE, a second downlink reference signal, wherein the second uplink reference signal is associated with the transmission of the second downlink reference signal.

21. The base station of claim 17, wherein:
the base station is a serving base station of the UE,
the base station receives the report from the UE, and
the base station receives the report on an uplink channel other than a channel on which the first and second uplink reference signals are received.

22. The base station of claim 17, wherein:
the base station is a neighboring base station of the UE, and
the base station receives the report from a serving base station for the UE.

23. The base station of claim 17, wherein the base station receives the report from a location server involved in a positioning session with the UE.

24. The base station of claim 17, wherein the information in the report includes an amount of a second timing adjustment parameter or one bit per uplink reference signal transmitted during the measurement window.

25. The base station of claim 24, wherein each bit of the report indicates whether or not a transmission timing of an uplink reference signal transmitted during the measurement window was changed up to a threshold from a transmission timing of a preceding uplink reference signal transmitted during the measurement window.

26. The base station of claim 24, wherein each bit of the report indicates whether or not a transmission timing of an uplink reference signal transmitted during the measurement window was changed up to a threshold from a transmission timing of a first-occurring uplink reference signal transmitted during the measurement window.

27. The base station of claim 17, wherein the information in the report comprises one bit indicating whether or not a transmission timing of any uplink reference signal transmitted during the measurement window was changed up to a threshold from a transmission timing of a first-occurring uplink reference signal transmitted during the measurement window.

28. The base station of claim 17, wherein the information in the report comprises one or more index values identifying which uplink reference signals transmitted during the measurement window have a transmission timing that is up to a threshold different from previous uplink reference signals transmitted during the measurement window.

29. A method of wireless communication performed by a user equipment (UE), comprising:
transmitting, at a first time during a measurement window for positioning purposes, a first uplink reference signal in accordance with a first timing adjustment parameter, wherein the first time is offset from a downlink frame time of a base station by an amount of the first timing adjustment parameter; and
transmitting, after transmission of the first uplink reference signal, a first report indicating that the first timing adjustment parameter has been applied to at least the first uplink reference signal, wherein the first report includes an offset parameter $N_{TAoffset}$ associated with the first timing adjustment parameter, and wherein a value of the offset parameter $N_{TAoffset}$ is based on a frequency range in which the first uplink reference signal is transmitted.

30. A method of wireless communication performed by a base station, comprising:
receiving, from a user equipment (UE) during a measurement window for positioning purposes, a first uplink reference signal;

receiving, from the UE during the measurement window, a second uplink reference signal;

receiving, after reception of the second uplink reference signal, a report indicating that a timing adjustment parameter has been adjusted for at least the second uplink reference signal wherein the report includes an offset parameter $N_{TAoffset}$ associated with the timing adjustment parameter, and wherein a value of the offset parameter $N_{TAoffset}$ is based on a frequency range in which the second uplink reference signal is transmitted; and determining one or more positioning measurements based on the first uplink reference signal, the second uplink reference signal, and information in the report related to the second uplink reference signal.

31. The UE of claim 2, wherein:

the at least one processor being configured to determine comprises the at least one processor being configured to receive, during the measurement window via the at least one transceiver, a timing adjustment command including the second timing adjustment parameter, and the at least one processor is configured to cause the at least one transceiver to transmit the second uplink reference signal in accordance with the second timing adjustment parameter in response to reception of the timing adjustment command.

32. The UE of claim 1, wherein the first report further includes a value of $N_{TA}$ of the first timing adjustment parameter.

* * * * *